(12) United States Patent
Shiraishi

(10) Patent No.: US 9,774,758 B2
(45) Date of Patent: Sep. 26, 2017

(54) IMAGE PROCESSING APPARATUS THAT EXTRACTS IMAGE SHOWING DISTINCTIVE CONTENT OF MOVING IMAGE

(71) Applicant: Kyocera Document Solutions Inc., Osaka (JP)

(72) Inventor: Takanori Shiraishi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/010,283

(22) Filed: Jan. 29, 2016

(65) Prior Publication Data

US 2016/0227054 A1 Aug. 4, 2016

(30) Foreign Application Priority Data

Jan. 29, 2015 (JP) .................................. 2015-015418

(51) Int. Cl.
*H04N 1/40* (2006.01)
*H04N 1/00* (2006.01)
(52) U.S. Cl.
CPC ..... *H04N 1/40068* (2013.01); *H04N 1/00442* (2013.01); *H04N 1/00461* (2013.01)
(58) Field of Classification Search
CPC combination set(s) only.
See application file for complete search history.

(56) References Cited

U.S. PATENT DOCUMENTS

| 2005/0007626 | A1* | 1/2005 | Takaiwa | H04N 1/00278 358/1.15 |
| 2008/0232764 | A1* | 9/2008 | Lawther | G11B 27/28 386/241 |
| 2009/0102807 | A1* | 4/2009 | Kashiwa | G06F 15/025 345/173 |
| 2010/0097642 | A1* | 4/2010 | Sumi | H04N 1/00244 358/1.15 |
| 2010/0302594 | A1* | 12/2010 | Chapman | G06T 11/60 358/1.18 |
| 2016/0211001 | A1* | 7/2016 | Sun | G11B 27/036 |

FOREIGN PATENT DOCUMENTS

| JP | H10-032773 A | 2/1998 |
| JP | 2001-265378 A | 9/2001 |
| JP | 2004-229160 A | 8/2004 |
| JP | 2004-248312 A | 9/2004 |
| JP | 2005-303840 A | 10/2005 |
| JP | 2010-245983 A | 10/2010 |
| JP | 2012-060238 A | 3/2012 |
| JP | 2012-085227 A | 4/2012 |

* cited by examiner

*Primary Examiner* — Barbara Reinier
(74) *Attorney, Agent, or Firm* — James Judge

(57) ABSTRACT

An image processing apparatus includes a moving image accepting unit, a detecting unit, an image extracting unit, a screen creating unit, a selection accepting unit, and an image output unit. The screen creating unit creates an operation screen for each of the scenes. The operation screen displays frame images in a list. The frame images constitute each of the scenes extracted by the image extracting unit. The selection accepting unit accepts a selection of a representative image in the operation screen created by the screen creating unit. The representative image represents the scenes among the frame images displayed in the list. The image output unit outputs the representative image accepted by the selection accepting unit.

17 Claims, 15 Drawing Sheets

| Resolution(dpi) | Optimum Size (Height×Width) |
|---|---|
| X1 | h1 × w1 |
| X2 | h2 × w2 |
| X3 | h3 × w3 |
| Others | h0 × w0 |

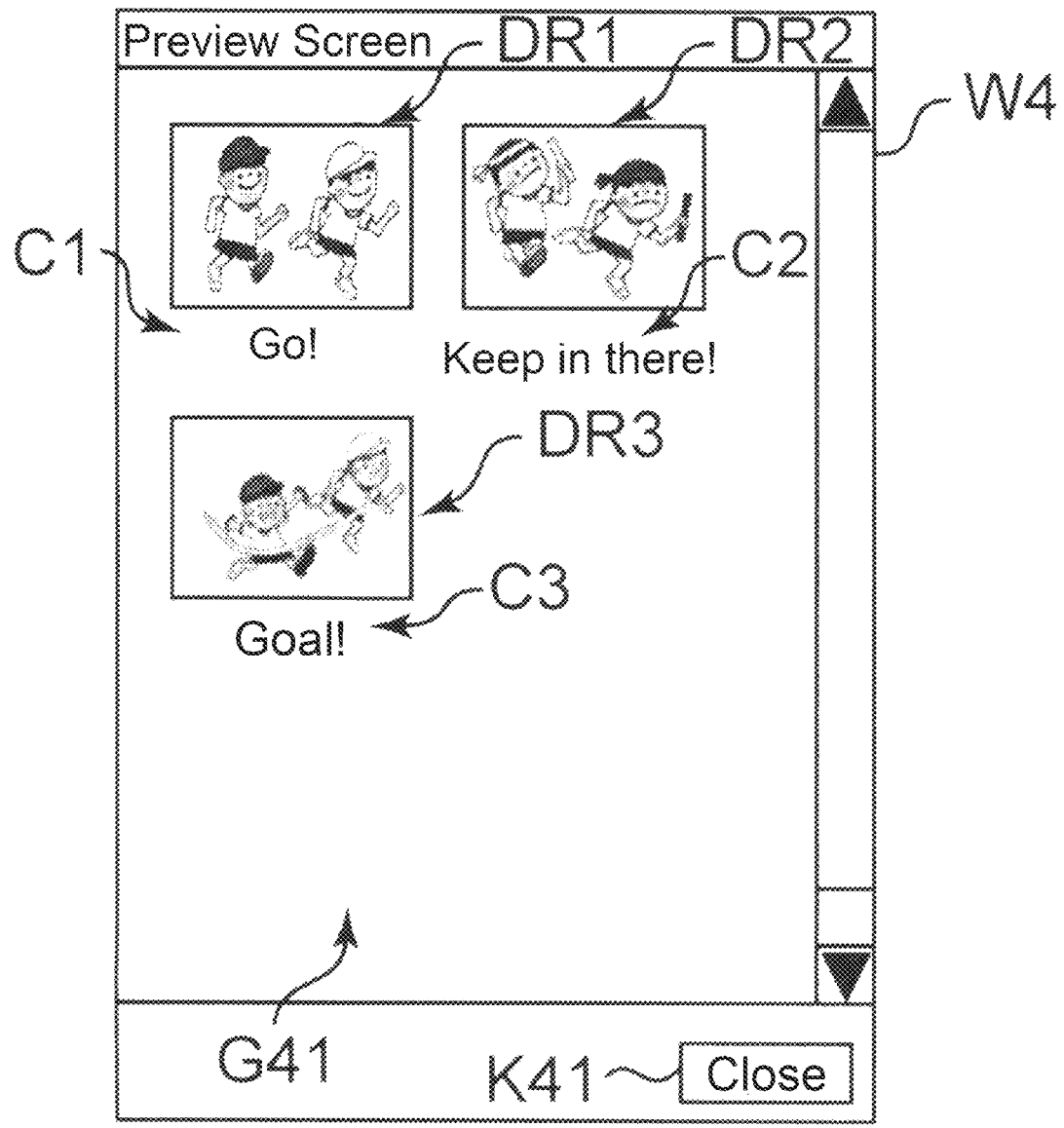

IMAGE PROCESSING APPARATUS THAT EXTRACTS IMAGE SHOWING DISTINCTIVE CONTENT OF MOVING IMAGE

INCORPORATION BY REFERENCE

This application is based upon, and claims the benefit of priority from, corresponding Japanese Patent Application No. 2015-015418 filed in the Japan Patent Office on Jan. 29, 2015, the entire contents of which are incorporated herein by reference.

BACKGROUND

Unless otherwise indicated herein, the description in this section is not prior art to the claims in this application and is not admitted to be prior art by inclusion in this section.

There is a known technique that extracts a representative image showing a distinctive content of a moving image from moving image data. This extracted representative image is output by, for example, being displayed on a display or printed.

SUMMARY

An image processing apparatus according to one aspect of the disclosure includes a moving image accepting unit, a detecting unit, an image extracting unit, a screen creating unit, a selection accepting unit, and an image output unit. The moving image accepting unit accepts an input of moving image data. The moving image data includes image data and voice data. The image data shows a plurality of images aligned chronologically. The voice data shows a plurality of voices corresponding to the plurality of images. The detecting unit detects one or more sample points as a reference sample point in accepted moving image data. The accepted moving image data is the moving image data accepted by the moving image accepting unit. A voice volume of the voice increases equal to or more than a predetermined reference voice volume difference at the reference sample point with respect to a voice volume of a voice corresponding to an immediately previous sample point. The image extracting unit extracts images by a predetermined count of samples at the respective reference sample points detected by the detecting unit from the accepted moving image data as frame images. The images including reference images correspond to the reference sample points and are aligned chronologically. The frame images constitute a scene corresponding to the reference sample point. The screen creating unit creates an operation screen for each of the scenes. The operation screen displays the frame images in a list. The frame images constitute each of the scenes extracted by the image extracting unit. The selection accepting unit accepts a selection of a representative image in the operation screen created by the screen creating unit. The representative image represents the scenes among the frame images displayed in the list. The image output unit outputs the representative image accepted by the selection accepting unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 9B illustrates an example of the preview screen when changing a layout and a relative output position.

DETAILED DESCRIPTION

Figure 1:
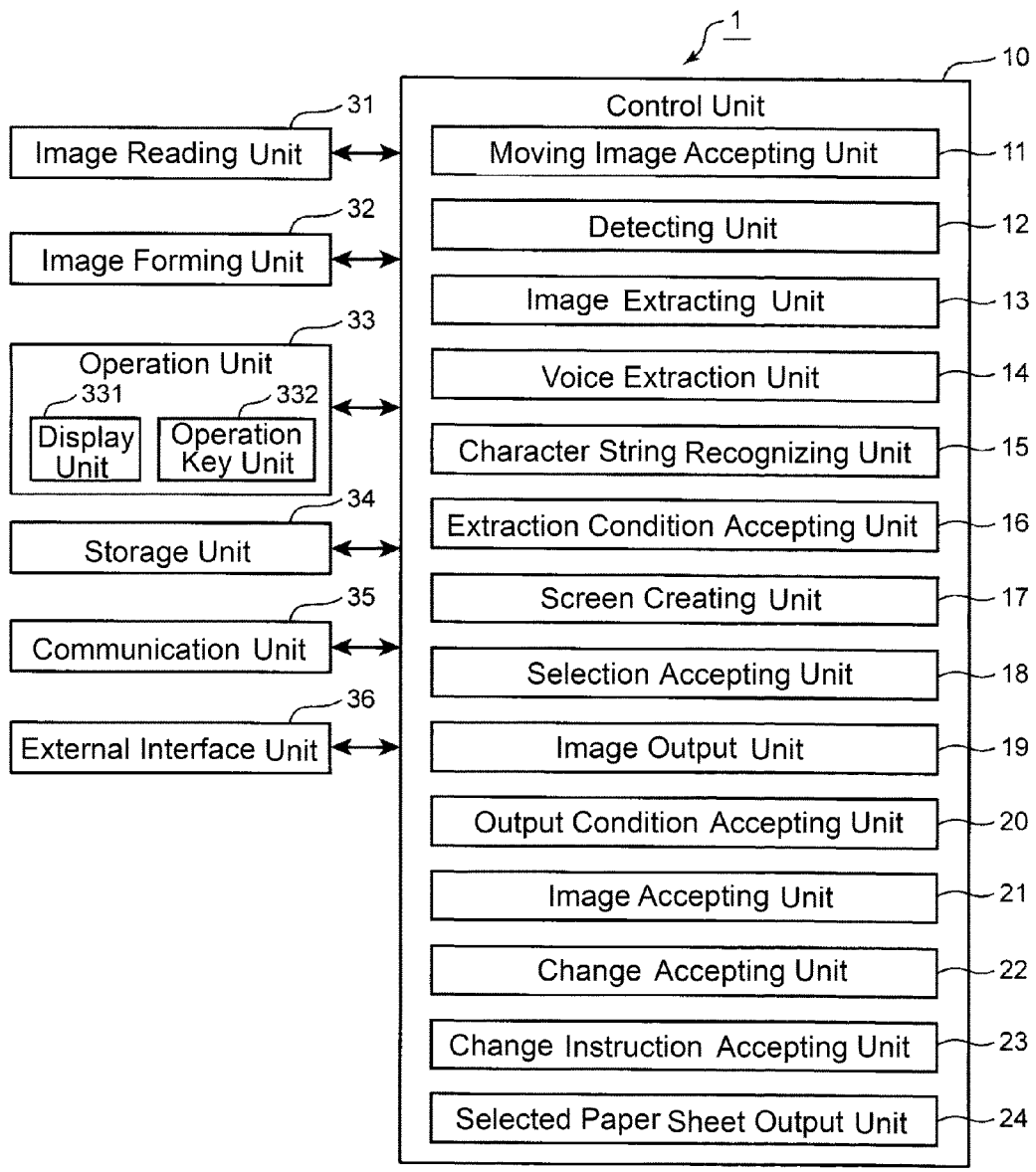
FIG. 1 illustrates an electrical configuration of an image processing apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of an image processing apparatus according to the disclosure based on the drawings. This embodiment gives the description with an example of a multi-functional peripheral as the image processing apparatus. However, this does not limit the gist. The image processing apparatus may be, for example, a scanner or a copier.

FIG. 1 illustrates an electrical configuration of a multi-functional peripheral 1 as an image processing apparatus. As illustrated in FIG. 1, the multi-functional peripheral 1 includes an image reading unit 31, an image forming unit 32, an operation unit 33, a storage unit 34 (a size storage unit), a communication unit 35, an external interface unit 36, and a control unit 10.

The image reading unit 31 includes an optical system unit (not illustrated), which includes a charge coupled device (CCD) line sensor, an exposing lamp, or a similar unit. The image reading unit 31 performs the following scanning process. Under control by the control unit 10, the image reading unit 31 causes the optical system unit to read images on documents to create image data showing the images on the documents and output this image data to the control unit 10.

Under control by the control unit 10, the image forming unit 32 performs the following printing process. The image forming unit 32 forms the images on paper sheets based on the image data, which is input to the control unit 10. Specifically, the image forming unit 32 has a known configuration including a photoreceptor drum, a charging unit, an exposure unit, a developing unit, a cleaning unit, and a similar unit. The charging unit is arranged facing a circumference surface of the photoreceptor drum. The exposing unit is arranged facing the circumference surface of the photoreceptor drum and is located downstream of the charging unit viewed in a rotation direction of the photoreceptor drum. The developing unit is arranged facing the circumference surface of the photoreceptor drum where the surface is downstream of the exposing unit. The cleaning unit is arranged facing the circumference surface of the photoreceptor drum where the surface is downstream of the developing unit.

The operation unit 33 includes a display unit 331 and an operation key unit 332. The operation key unit 332 is to cause a user to perform various operations. The display unit 331 is, for example, a liquid crystal display with a touch panel function. The display unit 331 displays various pieces of information. The operation key unit 332 includes various keys, for example, a numeric keypad and direction keys. Values and signs are input with the numeric keypad. With the direction keys, a pointer (a cursor), which is displayed on the display unit 331, is moved.

The storage unit 34 is configured of a storage device such as a hard disk drive (HDD) and a solid state drive (SSD). The storage unit 34 stores the image data created by the image reading unit 31, data received by the communication unit 35, moving image data accepted by a moving image accepting unit 11, which will be described later, or similar data. The storage unit 34 preliminary stores initial values of various setting values used to control the multi-functional peripheral 1 by the control unit 10.

The communication unit 35 is a communication interface circuit for communications between an external device, such as a personal computer, and the control unit 10 via a local area network (LAN) or a similar medium.

The external interface unit 36 includes a socket. To the socket, a cable connector, which is connected to external equipment such as a digital camcorder and a smart phone, is attachably/removably connected. When the cable connector connected to the external equipment is connected to this socket, the external interface unit 36 performs input/output of data with a storage device inside this external equipment via this cable connector.

The control unit 10 includes, for example, a central processing unit (CPU) (not shown) for executing a predetermined arithmetic operation, a non-volatile memory (not shown) such as an EEPROM storing a predetermined control program, a random access memory (RAM) (not shown) for temporarily storing data, and a peripheral circuit of these elements. The control unit 10 causes the CPU to execute a control program stored in the non-volatile memory or a similar memory to perform various processes, thus controlling operations of the respective units in the multi-functional peripheral 1.

The control unit 10 especially operates as the moving image accepting unit 11, a detecting unit 12, an image extracting unit 13, a voice extraction unit 14, a character string recognizing unit 15, an extraction condition accepting unit 16 (a first accepting unit, a second accepting unit, a third accepting unit, and a fourth accepting unit), a screen creating unit 17, a selection accepting unit 18, an image output unit 19, an output condition accepting unit 20 (a location accepting unit, a size accepting unit, and a position accepting unit), an image accepting unit 21, a change accepting unit 22, a change instruction accepting unit 23, and a selected paper sheet output unit 24.

The moving image accepting unit 11 accepts an input of moving image data showing a moving image. Specifically, when the communication unit 35 receives the moving image data transmitted from the external device, the moving image accepting unit 11 obtains this moving image data input to the control unit 10 to accept the input of this moving image data. The following is assumed. The cable connector, which is connected to the external equipment such as the digital camcorder, is connected to the socket of the external interface unit 36. By the user's operation to the operation unit 33, a capturing instruction of the moving image data stored in the storage device inside this external equipment is input. In this case, following this capturing instruction, the moving image accepting unit 11 controls the external interface unit 36 to obtain this moving image data, which is stored in the storage device inside the external equipment. Accordingly, the moving image accepting unit 11 accepts the input of this moving image data.

The detecting unit 12 detects one or more sample points as reference sample point in the accepted moving image data, which is the moving image data accepted by the moving image accepting unit 11. At the reference sample points, the voice volume of voice increases equal to or more than a predetermined reference voice volume difference with respect to the voice volume of voice corresponding to the immediately previous sample point.

The image extracting unit 13 extracts images by a predetermined number of samples at the respective reference sample points, which are detected by the detecting unit 12, from the accepted moving image data as frame images. The images include reference images corresponding to these reference sample points and are aligned chronologically. The frame images constitute scenes corresponding to these reference sample points.

The voice extraction unit 14 extracts a predetermined number of voices at the respective reference sample points, which are detected by the detecting unit 12, from the accepted moving image data as representative voices. The predetermined number of voices include reference voices corresponding to these reference sample points and are continuous chronologically. The representative voice represents scenes corresponding to these reference sample points.

Figure 2:
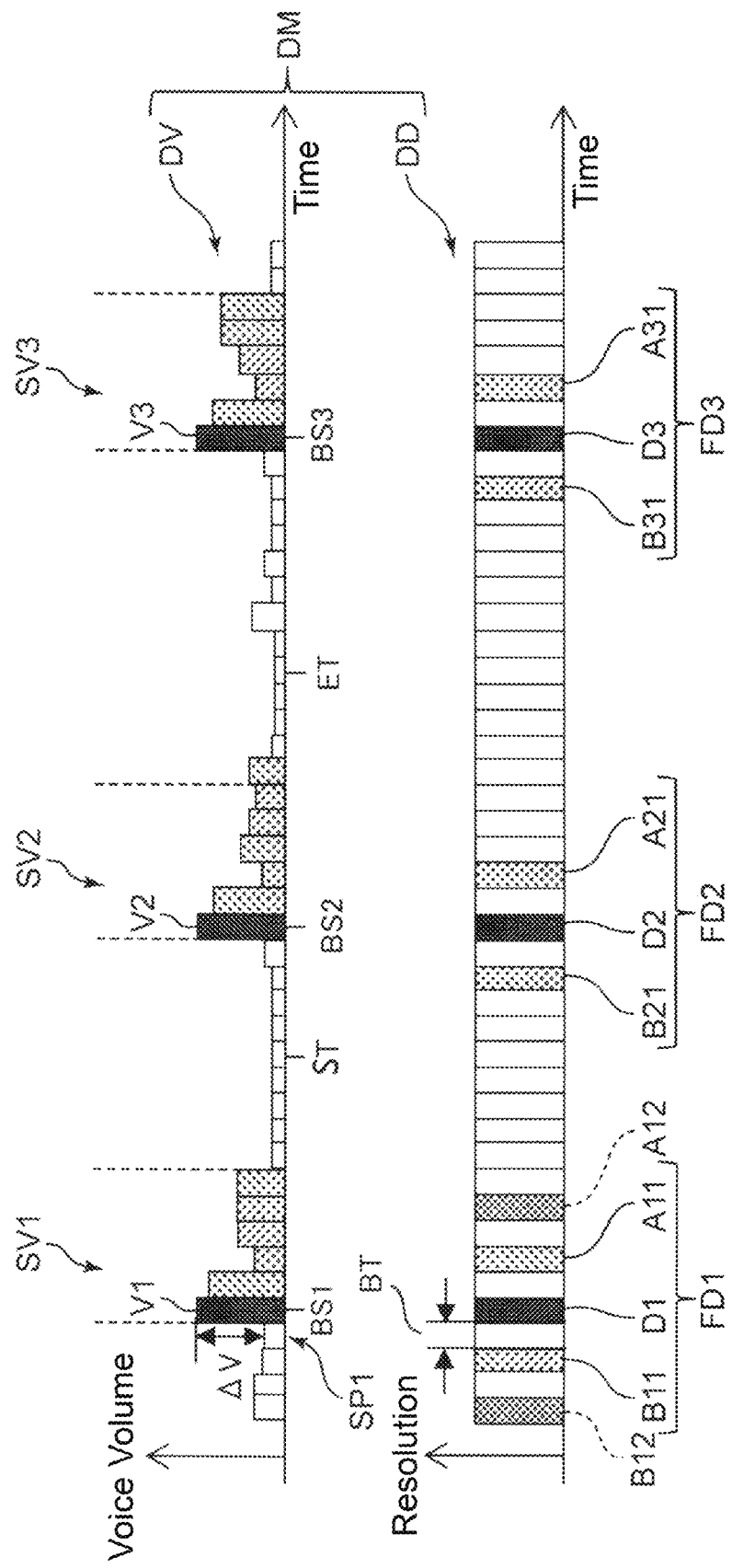
FIG. 2 schematically illustrates a configuration of moving image data according to one embodiment.

The following describes the configuration of the moving image data and details of the detecting unit 12, the image extracting unit 13, and the voice extraction unit 14 with reference to FIG. 2. FIG. 2 schematically illustrates a configuration of moving image data DM.

As illustrated in FIG. 2, the moving image data DM includes image data DD and voice data DV. The image data DD is created by sampling the images of the moving image at predetermined time intervals. The voice data DV is created by sampling the voices of the moving image at predetermined time intervals. The image data DD is formed of a plurality of images (a plurality of rectangular portions) corresponding to the plurality of sample points and are aligned chronologically. The voice data DV is formed of a plurality of voices (a plurality of rectangular portions) corresponding to the plurality of sample points and are aligned chronologically. The moving image data DM includes property data (not illustrated), such as the length (the time) of the moving image shown by this moving image data DM and date and time of the creation.

In FIG. 2, the horizontal axis of the image data DD indicates the time while the vertical axis indicates resolutions of the plurality of respective images included in the image data DD. The plurality of images included in the image data DD all have identical resolution. The horizontal axis of the voice data DV indicates the time while the vertical axis indicates voice volumes of the plurality of respective voices (a plurality of rectangular portions) included in the voice data DV. The voice volumes of the plurality of voices included in the voice data DV illustrated in FIG. 2 change chronologically.

In the moving image data DM illustrated in FIG. 2, the time interval used for sampling the respective images included in the image data DD is identical to the time interval used for sampling the respective voices included in the voice data DV. The images corresponding to the respective sample points correspond to the voices corresponding to the respective sample points on a one-to-one basis.

However, this should not be constructed in a limiting sense. The time interval used for sampling the respective images included in the image data DD and the time interval used for sampling the respective voices included in the voice data DV may be different from one another. That is, the images corresponding to the respective sample points and the voices corresponding to the respective sample points may have the relationship corresponding on a one-to-one basis or many-to-one basis.

The following gives a description assuming that the moving image accepting unit 11 accepts the moving image data DM illustrated in FIG. 2. The moving image data DM accepted by the moving image accepting unit 11 is referred to as accepted moving image data DM.

Using the voice data DV included in the accepted moving image data DM, the detecting unit 12 detects a sample point at which the voice volume of voice corresponding to each sample point included in this voice data DV increases more than the voice volume of voice corresponding to the sample point immediately before this sample point. When a voice volume difference $\Delta V$, which is a difference between the voice volume of voice corresponding to this detected sample point and the voice volume of voice corresponding to the sample point immediately before this detected sample point, is equal to or more than the predetermined reference voice volume difference, the detecting unit 12 detects this detected sample point as the reference sample point.

Here, the reference voice volume difference is determined by a ratio with respect to the voice volume of voice corresponding to the immediately previous sample point. In accordance with this, the detecting unit 12 calculates the voice volume difference $\Delta V$ by the ratio with respect to the voice volume of voice corresponding to the immediately previous sample point.

For example, assume that the reference voice volume difference is determined as 30%. Assume that, in FIG. 2, the voice volume of voice corresponding to a sample point BS1 is four times as large as the voice volume of voice corresponding to a sample point SP1, which is immediately before the sample point BS1.

In this case, the detecting unit 12 calculates the voice volume difference $\Delta V$ between the voice volume of voice corresponding to the sample point BS1 and the voice volume of voice corresponding to the sample point SP1 as "300%." Then, since this calculated voice volume difference $\Delta V$, "300%," is equal to or more than the reference voice volume difference, "30%," the detecting unit 12 detects the sample point BS1 as the reference sample point. Similar to this, FIG. 2 illustrates that the detecting unit 12 detects a sample point BS2 and a sample point BS3 as the reference sample points.

The following describes the three sample points BS1, BS2, and BS3 detected by the detecting unit 12 as the reference sample points as the reference sample points BS1, BS2, and BS3, respectively. The following describes a reference sample point BS as a generic term for the reference sample points detected by the detecting unit 12.

Thus, the reference voice volume difference is determined by the ratio with respect to the voice volume of voice corresponding to the immediately previous sample point. In accordance with this, the detecting unit 12 calculates the voice volume difference $\Delta V$ by the ratio with respect to the voice volume of voice corresponding to the immediately previous sample point. This ensures the detection of reference sample points by the detecting unit 12 even if the moving image data shows the moving image where the voice volume of voice is entirely small.

However, the reference voice volume difference is not limited to the ratio with respect to the voice volume of voice corresponding to the immediately previous sample point. The reference voice volume difference may be determined by an absolute value (for example, a decibel value) indicative of voice volume. In accordance with this, the detecting unit 12 may calculate the voice volume difference $\Delta V$ as a difference between the absolute value indicative of the voice volume of voice corresponding to the sample point and the absolute value of the voice volume of voice corresponding to the sample point immediately before this sample point.

When the detecting unit 12 detects the reference sample point BS, the image extracting unit 13 extracts a reference image D1 (D2 or D3), which corresponds to this reference sample point BS1 (BS2 or BS3) from the image data DD included in the accepted moving image data DM at each of these detected reference sample points BS.

The image extracting unit 13 extracts the images by the predetermined number of samples, which include the reference images D1 (D2 and D3) extracted by the detecting unit 12 and are aligned chronologically, from the image data DD included in the accepted moving image data DM as frame images FD1 (FD2 and FD3), which constitute the scenes corresponding to these reference sample points BS1 (BS2 and BS3). That is, the reference sample point BS and the scene have the relationship on a one-to-one basis.

For example, assume that the number of samples is determined as 3. In this case, as illustrated in FIG. 2, the image extracting unit 13 extracts the reference image D1 (D2 or D3), an image corresponding to a sample point B11 (B21 or B31), and an image corresponding to a sample point A11 (A21 or A31) as the frame image FD1 (FD2 or FD3). The sample point B11 (B21 or B31) is a point going back from the reference sample point BS1 (BS2 or BS3) to the past by a predetermined reference time BT. The sample point A11 (A21 or A31) is a point progressing from the reference sample point BS1 (BS2 or BS3) to the future by the reference time BT.

When the number of samples is determined as 5, the image extracting unit 13 extracts the reference image D1, the images corresponding to the two sample points B11 and B12, and the images corresponding to the two sample points A11 and A12 as the frame images constituting the scenes corresponding to the reference sample point BS1. The sample points B11 and B12 are points going back from the reference sample point BS1 to the past in units of the reference times BT. The sample points A11 and A12 are points progressing from the reference sample point BS1 to the future in units of the reference times BT.

For example, when the number of samples is determined as 3, different from the above-described extraction, the image extracting unit 13 may extract the reference image D1 and the images corresponding to the two sample points B11 and B12 as the frame image FD1 constituting the scene corresponding to the reference sample point BS1. The sample points B11 and B12 are points going back from the reference sample point BS1 in units of the predetermined reference times BT. That is, the image extracting unit 13 may not extract the images corresponding to sample points future of the reference sample point BS1, as the frame images FD1.

Alternatively, for example, when the number of samples is determined as 3, different from the above-described extraction, the image extracting unit 13 may extract the reference image D1 and images corresponding to the two sample points A11 and A12 as the frame image FD1 constituting the scene corresponding to the reference sample point BS1. The sample points A11 and A12 are points progressing from the reference sample point BS1 to the future in units of the predetermined reference times BT. That is, the image extracting unit 13 may not extract the images corresponding to the sample points past from the reference sample point BS1 as the frame images FD1.

That is, the image extracting unit 13 extracts the reference images D1 (D2 and D3), the images corresponding to the sample points going back to the past from the reference sample points BS1 (BS2 and BS3) in units of the predetermined reference times BT and/or the images corresponding to the sample points progressing to the future from the reference sample points BS1 (BS2 and BS3) in units of the reference times BT as the images included in the frame image FD1 (FD2 and FD3).

The following describes a frame image FD as the generic term for the frame images FD1, FD2, and FD3, which constitute the respective scenes. The following describes a reference image D as the generic term for the reference images D1, D2, and D3, which correspond to the reference sample points BS1, BS2, and BS3, respectively.

When the detecting unit 12 detects the reference sample point BS, the voice extraction unit 14 extracts reference voices V1 (V2 and V3) corresponding to these reference sample points BS1 (BS2 and BS3) at these respective detected reference sample points BS from the voice data DV included in the accepted moving image data DM.

The voice extraction unit 14 extracts the predetermined number of voices that include these extracted reference voices V1 (V2 and V3) and are continuous chronologically from the voice data DV included in the accepted moving image data DM as representative voices SV1 (SV2 and SV3), which represent the scenes corresponding to these reference sample points BS1 (BS2 and BS3).

Specifically, assume that the number of predetermined voices is determined as 6. In this case, as illustrated in FIG. 2, the image extracting unit 13 extracts the reference voices V1 (V2 and V3) and the voices corresponding to the five consecutive sample points future of the reference sample points BS1 (BS2 and BS3) as the representative voices SV1 (SV2 and SV3) representing the scenes corresponding to these reference sample points BS1 (BS2 and BS3).

The following describes the representative voice SV as a generic term for the representative voices SV1, SV2, and SV3, which represent the respective scenes.

Now referring to FIG. 1 again, the character string recognizing unit 15 performs the well-known predetermined voice recognition process on the respective representative voices SV, which are extracted by the voice extraction unit 14. Thus, the character string recognizing unit 15 recognizes the character strings indicative of the respective representative voices SV. The character string recognizing unit 15 inputs this recognized character string to an entry field G22 in a representative image selection screen W2, which will be described later, corresponding to the scene corresponding to each of these representative voices SV.

The extraction condition accepting unit 16 accepts the inputs of the above-described reference voice volume difference, reference time BT, and number of samples by the user. The extraction condition accepting unit 16 accepts the inputs of the start time and the finishing time by the user. In accordance with this, the detecting unit 12 detects the reference sample point BS in the accepted moving image data DM in a period from the start time accepted by the extraction condition accepting unit 16 until the finishing time accepted by the extraction condition accepting unit 16 in the accepted moving image data DM.

For example, as illustrated in FIG. 2, assume that the extraction condition accepting unit 16 accepts time ST as the start time and accepts time ET as the finishing time. In this case, the detecting unit 12 detects only the reference sample point BS2 in the moving image data DM in the period from the start time ST until the finishing time ET in the accepted moving image data DM.

Figure 3:
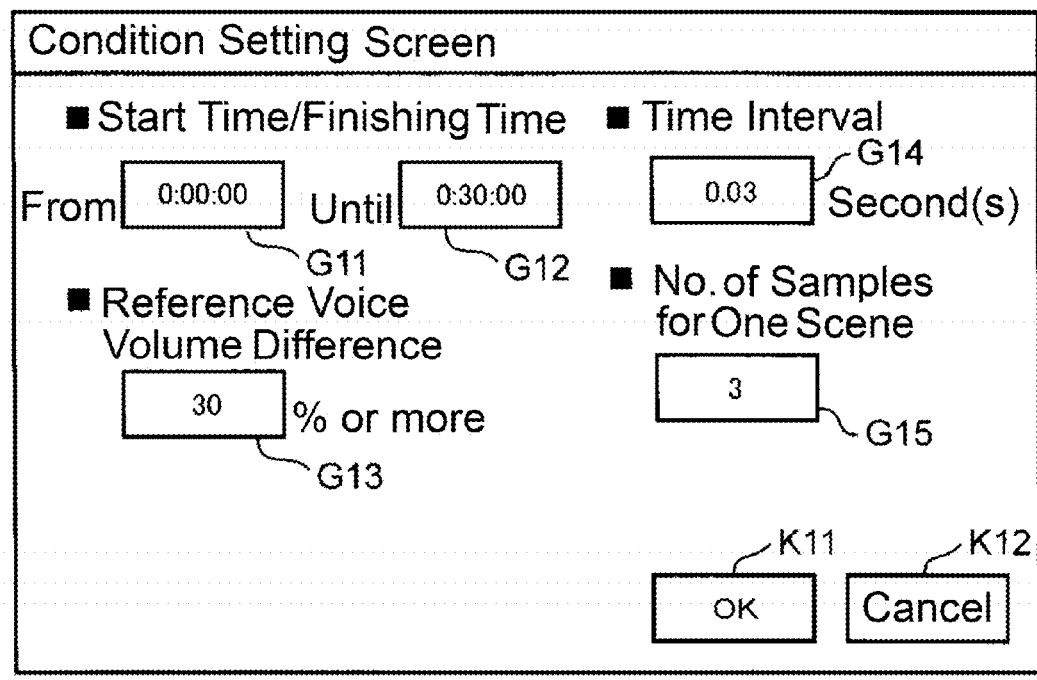
FIG. 3 illustrates an example of a condition setting screen according to one embodiment.

The following describes a method that the extraction condition accepting unit 16 accepts the inputs of the reference voice volume difference, the reference time BT, the number of samples, the start time, and the finishing time by the user with reference to FIG. 3. FIG. 3 illustrates an example of a condition setting screen W1.

The extraction condition accepting unit 16 displays the condition setting screen W1, which is illustrated in FIG. 3, on the display unit 331. As illustrated in FIG. 3, the condition setting screen W1 includes an entry field G11 for start time, an entry field G12 for finishing time, an entry field G13 for reference voice volume difference, an entry field G14 for the reference time BT, and an entry field G15 for the number of samples. The condition setting screen W1 further includes an OK button K11 and a cancel button K12.

To the entry field G11, the extraction condition accepting unit 16 inputs the start time of moving image shown by the accepted moving image data DM, "0: 00: 00" at the beginning of displaying the condition setting screen W1. To the entry field G12, the extraction condition accepting unit 16 inputs the finishing time of moving image shown by the accepted moving image data DM at the beginning of displaying the condition setting screen W1.

For example, assume that the length of the moving image shown by the accepted moving image data DM is 30 minutes and this accepted moving image data DM includes property data indicating the length of the moving image, "0: 30: 00." In this case, the extraction condition accepting unit 16 inputs the length of the moving image indicated by the property data, "0: 30: 00," to the entry field G12 at the beginning of displaying the condition setting screen W1.

Afterwards, the user operates the operation unit 33 to edit and input the start time, which is input to the entry field G11, and the finishing time, which is input to the entry field G12.

To the entry field G13, the extraction condition accepting unit 16 inputs the reference voice volume difference, which is preliminary stored on the non-volatile memory or a similar memory, at the beginning of displaying the condition setting screen W1. For example, assume that the reference voice volume difference is determined as 30% and stored on the non-volatile memory or a similar memory. In this case, the extraction condition accepting unit 16 displays the reference voice volume difference, "30," to the entry field G13. Afterwards, the user operates the operation unit 33 to edit and input the reference voice volume difference, which is input to the entry field G13.

To the entry field G14, the extraction condition accepting unit 16 inputs the reference time BT, which is preliminary stored on the non-volatile memory or a similar memory, at the beginning of displaying the condition setting screen W1. For example, assume that the reference time is determined as 0.03 seconds and stored on the non-volatile memory or a similar memory. In this case, the extraction condition accepting unit 16 inputs the reference time BT, "0.03," to the entry field G14. Afterwards, the user operates the operation unit 33 to edit and input the reference time BT, which is input to the entry field G14.

To the entry field G15, the extraction condition accepting unit 16 inputs the number of samples, which is preliminary stored on the non-volatile memory or a similar memory, at the beginning of displaying the condition setting screen W1. For example, assume that the number of samples is determined as 3 and stored on the non-volatile memory or a similar memory. In this case, the extraction condition accepting unit 16 inputs the number of samples, "3" to the entry field G15. Afterwards, the user operates the operation unit 33 to edit and input the number of samples, which is input to the entry field G15.

The OK button K11 is a button to confirm inputs of the start time, the finishing time, the reference voice volume difference, the reference time BT, and the number of samples to the entry fields G11 to G15. That is, upon pressing the OK button K11, the extraction condition accepting unit 16 determines that the inputs of the start time, the finishing time, the reference voice volume difference, the reference time BT, and the number of samples to the entry fields G11 to G15 have been confirmed. The extraction condition accepting unit 16 accepts the inputs of these start time, finishing time, reference voice volume difference, reference time BT, and number of samples. Then, the extraction condition accepting unit 16 terminates displaying the condition setting screen W1 on the display unit 331.

When the extraction condition accepting unit 16 accepts the inputs of the start time, the finishing time, the reference voice volume difference, the reference time BT, and the number of samples, the extraction condition accepting unit 16 updates the start time, the finishing time, the reference voice volume difference, the reference time BT, and the number of samples preliminary stored on the non-volatile memory or a similar memory by these accepted start time, finishing time, reference voice volume difference, reference time BT, and number of samples.

The cancel button K12 is a button to cancel inputs of the start time, the finishing time, the reference voice volume difference, the reference time BT, and the number of samples to the entry fields G11 to G15. That is, upon pressing the cancel button K12, the extraction condition accepting unit 16 determines that the inputs of the start time, the finishing time, the reference voice volume difference, the reference time BT, and the number of samples to the entry fields G11 to G15 have been canceled. The extraction condition accepting unit 16 does not accept the inputs of these start time, finishing time, reference voice volume difference, reference time BT, and number of samples and terminates displaying the condition setting screen W1 on the display unit 331.

Now referring to FIG. 1 again, the screen creating unit 17 creates the representative image selection screen (the operation screen). The representative image selection screen displays the frame images FD, which constitute these respective scenes extracted by the image extracting unit 13, in the respective scenes in a list. That is, the scene and the representative image selection screen have the relationship on a one-to-one basis.

The selection accepting unit 18 accepts a selection of a representative image, which represents the scenes, among the frame images displayed in a list in each representative image selection screen, which is created by the screen creating unit 17.

The following describes details of the screen creating unit 17 and the selection accepting unit 18. As illustrated in FIG. 2, the following gives a description assuming that the image extracting unit 13 extracts the frame image FD1, which constitutes the scene corresponding to the reference sample point BS1, the frame image FD2, which constitutes the scene corresponding to the reference sample point BS2, and the frame image FD3, which constitutes the scene corresponding to the reference sample point BS3.

The screen creating unit 17 creates the representative image selection screen, which displays the frame images FD1 constituting the scenes corresponding to the reference sample point BS1 in a list, the representative image selection screen, which displays the frame images FD2 constituting the scenes corresponding to the reference sample point BS2 in a list, and the representative image selection screen, which displays the frame images FD3 constituting the scenes corresponding to the reference sample point BS3 in a list.

Figure 4:
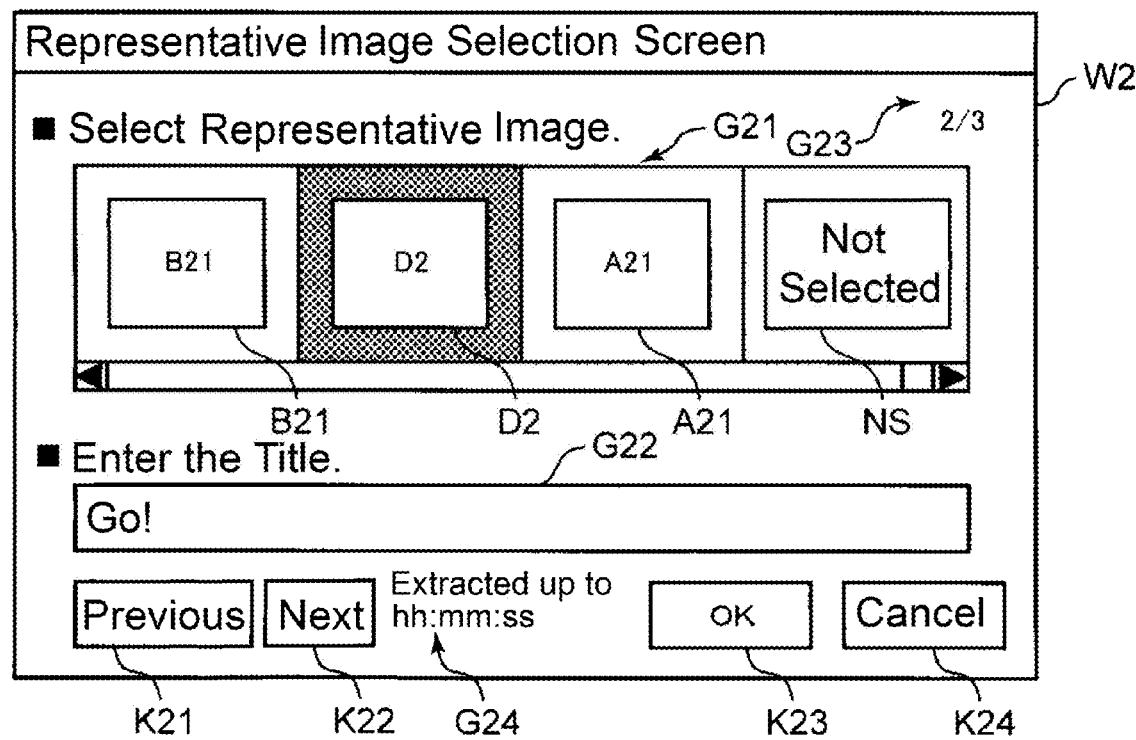
FIG. 4 illustrates an example of a representative image selection screen according to one embodiment.

The selection accepting unit 18 sequentially displays the three representative image selection screens, which are created by the screen creating unit 17, on the display unit 331. FIG. 4 illustrates an example of a representative image selection screen W2. The following describes the representative image selection screen W2, which corresponds to a scene corresponding to the reference sample point BS2 as a representative of these three representative image selection screens.

As illustrated in FIG. 4, the representative image selection screen W2 includes a selection field G21, an entry field G22, a display field G23, a display field G24, a previous button K21, a next button K22, an OK button K23, and a cancel button K24. The selection field G21 is for representative image representing the scene corresponding to the reference sample point BS2. The entry field G22 is for character string expressing this scene (hereinafter described as a scene character string).

The screen creating unit 17 selectably displays the images B21, D2, and A21 (FIG. 2), which are included in the frame image FD2 constituting the scene corresponding to the reference sample point BS2, on the selection field G21 in a list. The screen creating unit 17 selectably displays a non-selection instruction image NS on the selection field G21. The non-selection instruction image NS is to input a non-selection instruction, which instructs deselecting the representative image representing the scene corresponding to the reference sample point BS2.

The user operates the operation unit 33 to select any of the images B21, D2, and A21, which are included in the frame image FD2, displayed on the selection field G21 in a list as the representative image constituting the scene corresponding to the reference sample point BS2 or select the non-selection instruction image NS.

At the beginning of creating the representative image selection screen W2 by the screen creating unit 17, the character string recognizing unit 15 inputs the character string expressing the representative voice SV, which corresponds to the scene corresponding to the reference sample point BS2, to the entry field G22 as the scene character string. The user operates the operation unit 33 to edit and input the scene character string, which is input to the entry field G22 in this representative image selection screen W2.

The screen creating unit 17 displays information to cause the user to identify the scene corresponding to this representative image selection screen W2 on the display field G23. In FIG. 4, to cause the user to identify the scene corresponding to this representative image selection screen W2 is the scene corresponding to the reference sample point BS2, which is the second-detected sample point among the three reference sample points BS1, BS2, and BS3 detected by the detecting unit 12, the screen creating unit 17 displays the character string "2/3" on the display field G23.

The detecting unit 12 displays the time when the detection of the reference sample points BS are terminated in the accepted moving image data DM on the display field G24. For example, when the detecting unit 12 terminates detecting the reference sample points BS using voice until the time "hh:mm:ss" included in the accepted moving image data DM, the detecting unit 12 displays this time "hh:mm:ss" on the display field G24.

The previous button K21 is a button to display the representative image selection screen W2 corresponding to the scene previous to the scene corresponding to this representative image selection screen W2 instead of this representative image selection screen W2. "The scene previous to the scene corresponding to this representative image selection screen W2" means the scene corresponding to the reference sample point BS detected by the detecting unit 12 prior to the reference sample point BS corresponding to the scene corresponding to this representative image selection screen W2.

That is, assume that, by the user's operation on the operation unit 33, the previous button K21, which is illustrated in FIG. 4, on the representative image selection screen W2 is pressed. In this case, the selection accepting unit 18 displays the representative image selection screen W2 corresponding to the scene corresponding to the reference sample point BS1, which is detected before the reference sample point BS2, on the display unit 331, instead of the representative image selection screen W2 illustrated in FIG. 4.

The next button K22 is a button to display the representative image selection screen W2 corresponding to the scene next to the scene corresponding to this representative image selection screen W2, instead of this representative image selection screen W2. "The scene next to the scene corresponding to this representative image selection screen W2" means the scene corresponding to the reference sample point BS detected by the detecting unit 12 after the reference sample point BS corresponding to the scene corresponding to this representative image selection screen W2.

That is, assume that, by the user's operation on the operation unit 33, the next button K22, which is illustrated in FIG. 4, on the representative image selection screen W2 is pressed. In this case, the selection accepting unit 18 displays the representative image selection screen W2 corresponding to the scene corresponding to the reference sample point BS3, which is detected after the reference sample point BS2, on the display unit 331, instead of the representative image selection screen W2 illustrated in FIG. 4.

The OK button K23 is a button to confirm the selection of the representative image or the non-selection instruction image in the selection field G21 in all the representative image selection screens W2 created by the screen creating unit 17 and inputs of scene character string to the entry field G22 in all the representative image selection screens W2 created by the screen creating unit 17.

When the user does not select the representative image or the non-selection instruction image in the selection field G21 in at least one representative image selection screens W2 created by the screen creating unit 17, the selection accepting unit 18 disables pressing the OK button K23 (grayed).

That is, upon pressing the OK button K23, the selection accepting unit 18 determines that the selection of the representative image, which represents the respective scenes, or the non-selection instruction image NS and the inputs of the scene character strings for the respective scenes have been confirmed in the all representative image selection screens W2, which are created by the screen creating unit 17, the selection accepting unit 18 then accepts this selection and these inputs. The selection accepting unit 18 terminates displaying the representative image selection screen W2 on the display unit 331.

When the selection accepting unit 18 accepts the selection of the non-selection instruction image NS, the selection accepting unit 18 determines that the non-selection instruction has been input. The selection accepting unit 18 does not accept the selection of the representative image representing the scene corresponding to the representative image selection screen W2 on which this non-selection instruction image NS is displayed.

For example, assume that the reference image D1 is selected as the representative image in the selection field G21 in the representative image selection screen W2 corresponding to the scene corresponding to the reference sample point BS1. Assume that an image B21 is selected as the representative image in the selection field G21 in the representative image selection screen W2 corresponding to the scene corresponding to the reference sample point BS2. Assume that the non-selection instruction image NS is selected in the selection field G21 in the representative image selection screen W2 corresponding to the scene corresponding to the reference sample point BS3. In this case, assume that the user presses the OK button K23 in the representative image selection screen W2 displayed on the display unit 331.

In this case, the selection accepting unit 18 accepts the reference image D1 as the representative image representing the scene corresponding to the reference sample point BS1. The selection accepting unit 18 accepts the image B21 as the representative image representing the scene corresponding to the reference sample point BS2. However, the selection accepting unit 18 does not accept the selection of the representative image representing the scene corresponding to the reference sample point BS3.

The cancel button K24 is a button to cancel the selection of the representative image or the non-selection instruction image in the selection field G21 in the all representative image selection screens W2 created by the screen creating unit 17 and inputs of the scene character strings in the entry field G22 in the all representative image selection screens W2 created by the screen creating unit 17. That is, upon pressing the cancel button K24, the selection accepting unit 18 accepts none of the selection of representative images and terminates displaying the representative image selection screen W2 on the display unit 331.

Now referring to FIG. 1 again, the image output unit 19 outputs the respective representative images accepted by the selection accepting unit 18. The details of the image output unit 19 will be described later.

The output condition accepting unit 20, the image accepting unit 21, the change accepting unit 22, the change instruction accepting unit 23, and the selected paper sheet output unit 24 perform operations related to outputs of the respective representative images by the image output unit 19. The details of these respective units will also be described later.

Figure 5:
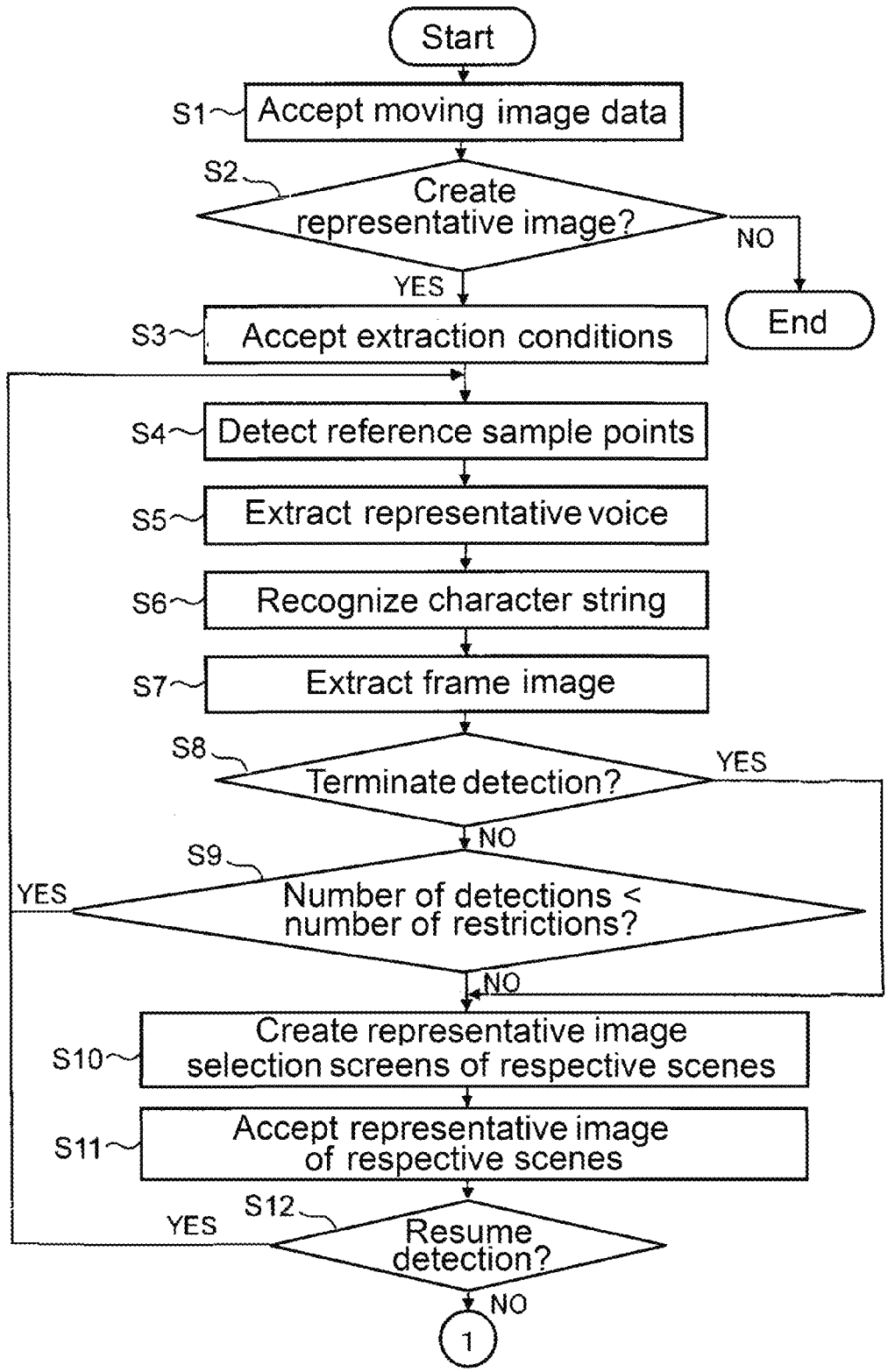
FIG. 5 illustrates operations of creating a representative image according to one embodiment.

The following describes operations of creating the representative image, which shows the content of the moving image shown by the accepted moving image data DM. FIG. 5 illustrates the operation of creating the representative image.

Assume that, as illustrated in FIG. 5, the moving image accepting unit 11, as described above, accepts the inputs of the moving image data DM transmitted from the external device and the moving image data DM stored on the storage device inside the external device (S1). In this case, the control unit 10 displays an operation screen (not illustrated) on which whether to create the representative image showing the content of the moving image shown by this accepted moving image data DM or not can be selected on the display unit 331.

When the creation of the representative image is selected in this operation screen (S2: YES), the extraction condition accepting unit 16 displays the condition setting screen W1 (FIG. 3) on the display unit 331. Using this condition setting screen W1, as described above, the extraction condition accepting unit 16 accepts the inputs of the reference voice volume difference, the reference time BT, the number of samples, the start time, and the finishing time (S3). Meanwhile, when the user does not select the creation of the representative image in this operation screen (S2: NO), the control unit 10 does not perform the operation of creating the representative image but stores the accepted moving image data DM on the storage unit 34 and terminates the process.

After the execution of Step S3, the detecting unit 12, as described above, detects the reference sample points BS in the accepted moving image data DM in the period from the start time until the finishing time accepted at Step S3 (S4).

The voice extraction unit 14, as described above, extracts the representative voice SV, which represents the scene corresponding to each of the reference sample points BS detected by the detecting unit 12, from the voice data DV included in the accepted moving image data DM (S5). The character string recognizing unit 15, as described above, recognizes the character string expressing each representative voice SV, which is extracted at Step S5 (S6).

As described above, the image extracting unit 13 extracts the frame image FD, which constitutes the scene corresponding to each reference sample point BS detected by the detecting unit 12 from the image data included in the accepted moving image data DM (S7).

When the detecting unit 12 does not terminate the detection of the reference sample points BS in the accepted moving image data DM in the period from the start time until the finishing time accepted at Step S3 (S8: NO) and the number of detected reference sample points BS is less than a predetermined number of restrictions (S9: YES), the detecting unit 12 continues detecting the reference sample points BS (S4). The non-volatile memory or a similar memory preliminary stores the above-described number of restrictions.

Meanwhile, when the detecting unit 12 does not terminate the detection of the reference sample points BS in the accepted moving image data DM in the period from the start time until the finishing time accepted at Step S3 (S8: NO) and the number of detected reference sample points BS reaches the number of restrictions (S9: YES), the detecting unit 12 halts detection of the reference sample points BS. Afterwards, a process at Step S10 and processes after Step S10, which will be described later, are performed.

When the detecting unit 12 terminates the detection of the reference sample points BS in the accepted moving image data DM in the period from the start time until the finishing time accepted at Step S3 (S8: YES), a process at Step S10 and processes after Step S10, which will be described later, are performed.

At Step S10, the screen creating unit 17, as described above, creates the respective representative image selection screens W2 (FIG. 4) corresponding to these scenes (S10). The representative image selection screen W2 displays the frame images FD, which constitute the respective scenes extracted by the image extracting unit 13, in a list.

At this time, when the detecting unit 12 halts the detection of the reference sample points BS, the detecting unit 12 displays this halted time in the display field G24 in each representative image selection screen W2. Alternatively, when the detecting unit 12 terminates the detection of the reference sample points BS, the detecting unit 12 displays the finishing time accepted at Step S3 in the display field G24 in each representative image selection screen W2.

After execution of Step S10, the selection accepting unit 18, as described above, displays the respective representative image selection screens W2, which are created at Step S10, sequentially on the display unit 331. When the selection accepting unit 18, as described above, accepts the selection of the representative image, which represents the respective scenes corresponding to the respective representative image selection screens W2, or the non-selection instruction image NS and the input of the scene character string for each scene, the selection accepting unit 18 terminates displaying the respective representative image selection screens W2 on the display unit 331 (S11). Here, the character string expressing the representative voice SV, which corresponds to each scene recognized at Step S6, is automatically input to the entry field G22 as each scene character string. This input character string is editable.

When the detecting unit 12 halts the detection of the reference sample points BS, after terminating Step S11, the detecting unit 12 displays the operation screen (not illustrated) on the display unit 331. With the operation screen, whether to resume the detection of the reference sample points BS after this halted time or not can be selected.

When the user selects the resumption of detection of the reference sample points BS (S12: YES), the detecting unit 12 resets the number of detected reference sample points BS to 0 and resumes the detection of the reference sample points BS (S4). Meanwhile, when the user selects not to resume the detection of the reference sample points BS (S12: NO), the detecting unit 12 terminates the detection of the reference sample points BS. When the detecting unit 12 has terminated the detection of the reference sample points BS, after terminating Step S11, the detecting unit 12 does not resume the detection of the reference sample points BS.

That is, whenever the number of detected reference sample points BS reaches the predetermined number of restrictions (S9: NO), the detecting unit 12 halts the detection of the reference sample points BS. The detecting unit 12 causes the user to select whether to resume the detection of the reference sample points BS from now or not. When the user selects the resumption of detection of the reference sample points BS (S12: YES), the detecting unit 12 resumes the detection of the subsequent reference sample points BS. Meanwhile, when the user selects not to resume the detection of the reference sample points BS (S12: NO), the detecting unit 12 terminates the detection of the reference sample points BS.

Figure 6:
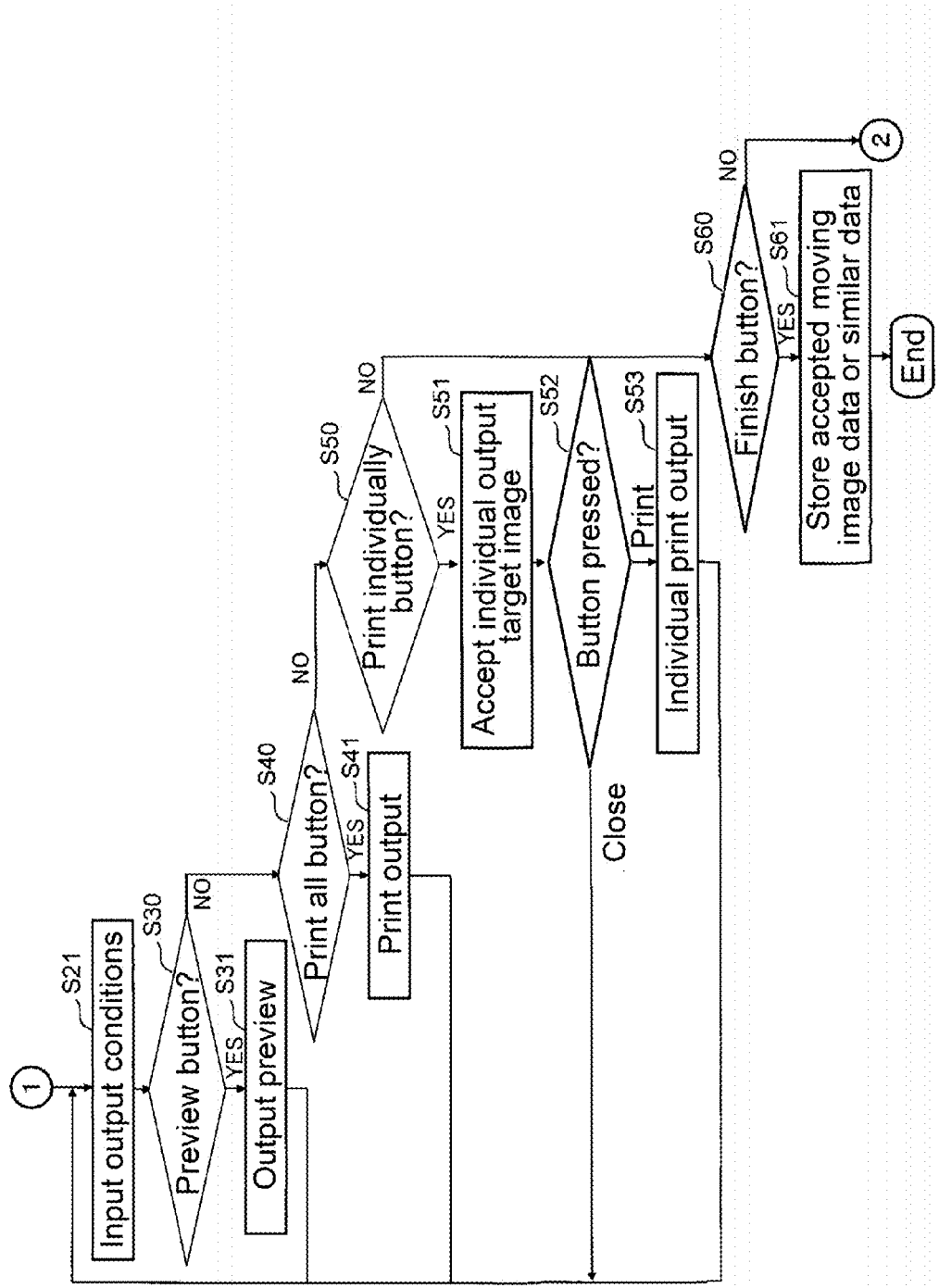
FIG. 6 illustrates operations of outputting the representative image according to one embodiment.
Figures 7, 8:
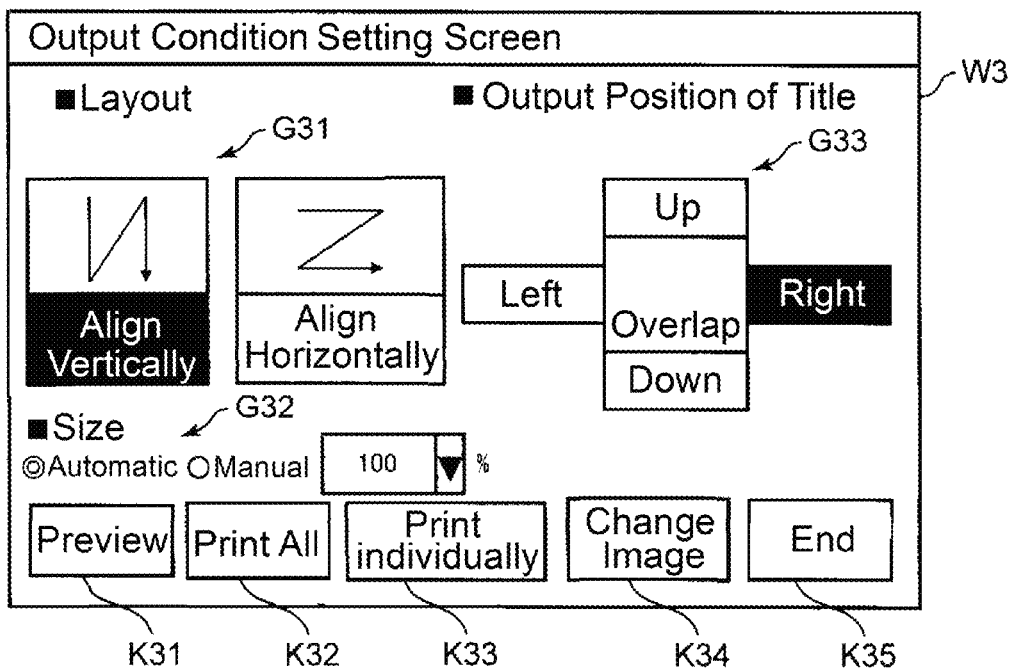
FIG. 7 illustrates an example of an output condition setting screen according to one embodiment.
FIG. 8 illustrates examples of optimum sizes stored in a size storage unit according to one embodiment.

The following describes the operations of outputting the respective representative images created by the operations illustrated in FIG. 5. This explanation describes the details of the image output unit 19, the output condition accepting unit 20, the image accepting unit 21, the change accepting unit 22, the change instruction accepting unit 23, and the selected paper sheet output unit 24. FIG. 6 illustrates the operations of outputting the representative image. FIG. 7 illustrates an example of an output condition setting screen W3.

When the operations illustrated in FIG. 5 terminate, as illustrated in FIG. 6, the output condition accepting unit 20 displays the output condition setting screen W3, which is illustrated in FIG. 7, on the display unit 331. The output condition accepting unit 20 causes the user to input output conditions for outputting the respective representative images to this output condition setting screen W3 (S21).

The output conditions include a layout, a size of each representative image when each representative image is output, and an output position. When outputting each representative image, each representative image is located according to the layout. When outputting the representative image made correspond to the scene character string corresponding to this representative image, the output position is a relative output position of this character string with respect to this representative image.

Specifically, as illustrated in FIG. 7, the output condition setting screen W3 includes a layout selection field G31, an output size selection field G32, an output position selection field G33, a preview button K31, a print all button K32, a print individually button K33, a change image button K34, and a finish button K35.

The output condition accepting unit 20 selectably displays a plurality of layouts by which the respective representative images are located when outputting the respective representative images in the layout selection field G31. For example, in FIG. 7, the layout selection field G31 selectably displays "Align Vertically" and "Align Horizontally." "Align Vertically" is a layout that sequentially aligns the respective representative images vertically. "Align Horizontally" is a layout that sequentially aligns the respective representative images horizontally.

The layout by which the respective representative images are located is predetermined and is preliminary stored on the non-volatile memory or a similar memory. At the begging of displaying the output condition setting screen W3, the output condition accepting unit 20 displays the output condition setting screen W3 with the layout (for example, "Align Vertically") preliminary stored on the non-volatile memory or a similar memory selected.

Afterwards, the user operates the operation unit 33 to select and input the layout displayed on the layout selection field G31, "Align Vertically" or "Align Horizontally."

When any of buttons of the preview button K31, the print all button K32, the print individually button K33, and the change image button K34 are pressed, the output condition accepting unit 20 accepts the layout selected in the layout selection field G31 as the layout by which the respective representative images are located. When the output condition accepting unit 20 accepts the selection of this layout by the user, the layout by which the respective representative images are located, which is preliminary stored on the non-volatile memory or a similar memory, is updated by this layout.

The output condition accepting unit 20 selectably displays methods for determining the size of each representative image (hereinafter referred to as an output size) when outputting each representative image in the output size selection field G32 in an alternative manner. For example, in FIG. 7, as the method for determining the output size, radio buttons with which "Automatic" or "Manual" is selectable are displayed. "Automatic" automatically determines the output size. "Manual," causes the user to determine the desired output size intended by the user.

Further, only when "Manual" is selected as the method for determining the output size, the output condition accepting unit 20 displays an operable list box on the output size selection field G32. With this list box, among a plurality of predetermined conversion percentages, the user can select one conversion percentage.

The method for determining the output size is predetermined and is preliminary stored on the non-volatile memory or a similar memory. When the method for determining the output size is predetermined as "Manual," the above-described one conversion percentage is additionally predetermined and is preliminary stored on the non-volatile memory or a similar memory.

When the method for determining the output size is predetermined as "Automatic," at the beginning of displaying the output condition setting screen W3, the output condition accepting unit 20 displays the output condition setting screen W3 with the method for determining the output size preliminary stored on the non-volatile memory or a similar memory, "Automatic," selected.

When the method for determining the output size is predetermined as "Manual," at the beginning of displaying the output condition setting screen W3, the output condition accepting unit 20 displays the output condition setting screen W3 with the method for determining the output size preliminary stored on the non-volatile memory or a similar memory, "Manual," selected. In this case, the output condition accepting unit 20 displays the list box with the one conversion percentage preliminary stored on the non-volatile memory or a similar memory selected. For example, FIG. 7 illustrates the state where the list box is displayed with the one conversion percentage, "100%" selected.

Afterwards, the user operates the operation unit 33 to select and input the method for determining the output size displayed in the output size selection field G32.

Assume that when any of the preview button K31, the print all button K32, the print individually button K33, and the change image button K34 are pressed, "Automatic" is selected as the method for determining the output size in the output size selection field G32.

In this case, the output condition accepting unit 20 determines that, as the output size, an optimum size made correspond to the resolution of this representative image and preliminary stored on the storage unit 34 is selected and input. Then, the output condition accepting unit 20 accepts this optimum size as the output size. In this case, the output condition accepting unit 20 updates the method for determining the output size preliminary stored on the non-volatile memory or a similar memory by the method for determining this output size, "Automatic."

FIG. 8 illustrates examples of the optimum sizes stored in the storage unit 34. As illustrated in FIG. 8, the storage unit 34 preliminary stores the resolution of image made correspond to the optimum size. The optimum size is the size of image optimal for outputting the image with this resolution. For example, FIG. 8 illustrates that the storage unit 34 preliminary stores the resolution "X1" of image made correspond to the optimum size "h1×w1."

For example, assume that the resolution of the representative image is the resolution "X1." In this case, the output condition accepting unit 20 accepts the optimum size "h1×w1," which is preliminary stored on the storage unit 34 made correspond to the resolution "X1" of the representative image, as the output size.

Meanwhile, when the user selects "Manual" as the method for determining the output size, the user additionally selects and inputs the one conversion percentage to the list box.

Assume that when any of buttons of the preview button K31, the print all button K32, the print individually button K33, and the change image button K34 are pressed, "Manual" is selected as the method for determining the output size in the output size selection field G32 and the one conversion percentage is selected in the list box.

In this case, the output condition accepting unit 20 determines that the size after converting the size of this representative image by this selected one conversion percentage is calculated and this calculated size is selected as the output size. Then, the output condition accepting unit 20 accepts this calculated size as the output size.

In this case, the output condition accepting unit 20 updates the method for determining the output size preliminary stored on the non-volatile memory or a similar memory by the method for determining the output size, "Manual." The output condition accepting unit 20 updates the one conversion percentage preliminary stored on the storage unit 34 by the one conversion percentage selected in the list box.

The output condition accepting unit 20 selectably displays the output positions (hereinafter referred to as the relative output positions) of the scene character string relative to the representative image when this representative image and this scene character string expressing the scene corresponding to this representative image are made correspond to and output in the output position selection field G33.

For example, in FIG. 7, the output position selection field G33 selectably displays "Up," "Down," "Left," "Right," and "Overlap." "Up," "Down," "Left," and "Right" are four relative output positions indicative of output of the scene character string on the respective upper portion, the lower portion, the left portion, and the right portion of the representative image. "Overlap" is the relative output position indicative of output of the scene character string overlapping the representative image.

The relative output position is predetermined and preliminary stored on the non-volatile memory or a similar memory. At the begging of displaying the output condition setting screen W3, the output condition accepting unit 20 displays the output condition setting screen W3 with the relative output position (for example, "Right") preliminary stored on the non-volatile memory or a similar memory selected.

Afterwards, the user operates the operation unit 33 to select and input any one of the relative output positions among the relative output positions displayed in the output position selection field G33, "Up," "Down," "Left," "Right," and "Overlap."

When any of buttons of the preview button K31, the print all button K32, the print individually button K33, and the change image button K34 are pressed, the output condition accepting unit 20 accepts the selection of relative output position in the output position selection field G33. When the output condition accepting unit 20 accepts the selection of this relative output position by the user, the relative output position preliminary stored on the non-volatile memory or a similar memory is updated by this relative output position.

The preview button K31 is a button to perform a preview output process. The preview output process is a process that outputs each representative image by displaying a preview screen on the display unit 331. The preview screen displays each representative image made correspond to the scene character string, which expresses the scene corresponding to each of these representative images.

The print all button K32 is a button to perform an all-print-output process. The all-print-output process is a process that causes the image forming unit 32 to perform a printing process to output the respective representative images. The printing process forms all the representative images on the paper sheets.

The print individually button K33 is a button to cause the image output unit 19 to display an individual print output screen, which will be described later. The change image button K34 is a button to cause the image output unit 19 to display a change target selection screen, which will be described later. The finish button K35 is a button to terminate outputs of the respective representative images by the image output unit 19.

Operations when these respective buttons K31 to K35 are pressed will be described later.

Now referring to FIG. 6 again, assume that after inputting the output conditions to output the respective representative images at Step S21, the preview button K31 is pressed (S30: YES).

In this case, the output condition accepting unit 20 accepts the output conditions, which have been input at Step S21. The image output unit 19 performs the preview output process using these accepted output conditions (S31). Afterwards, processes after Step S21 are performed.

Figure 9A:
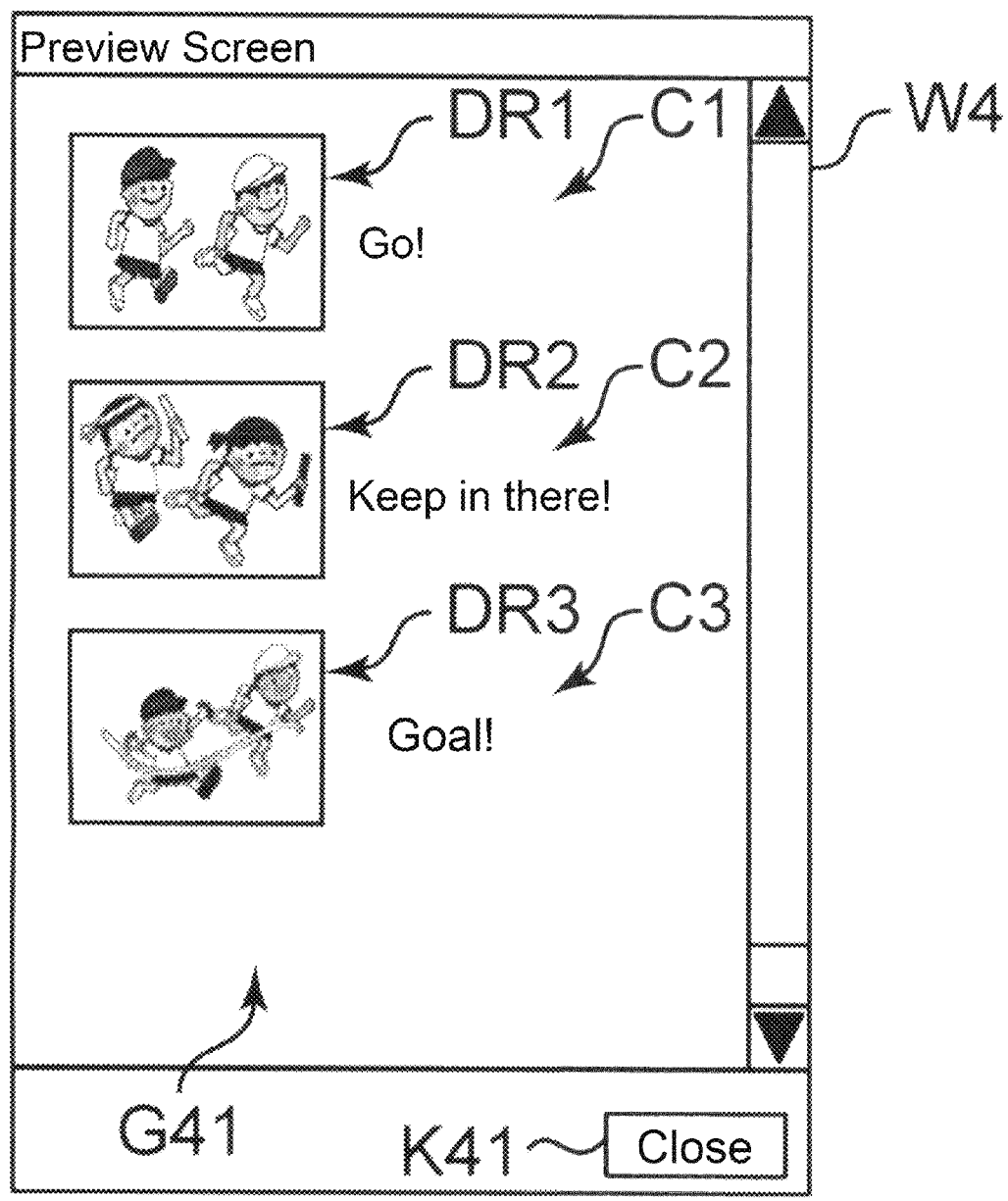
FIG. 9A illustrates an example of a preview screen when using predetermined output conditions.
Figure 9C:
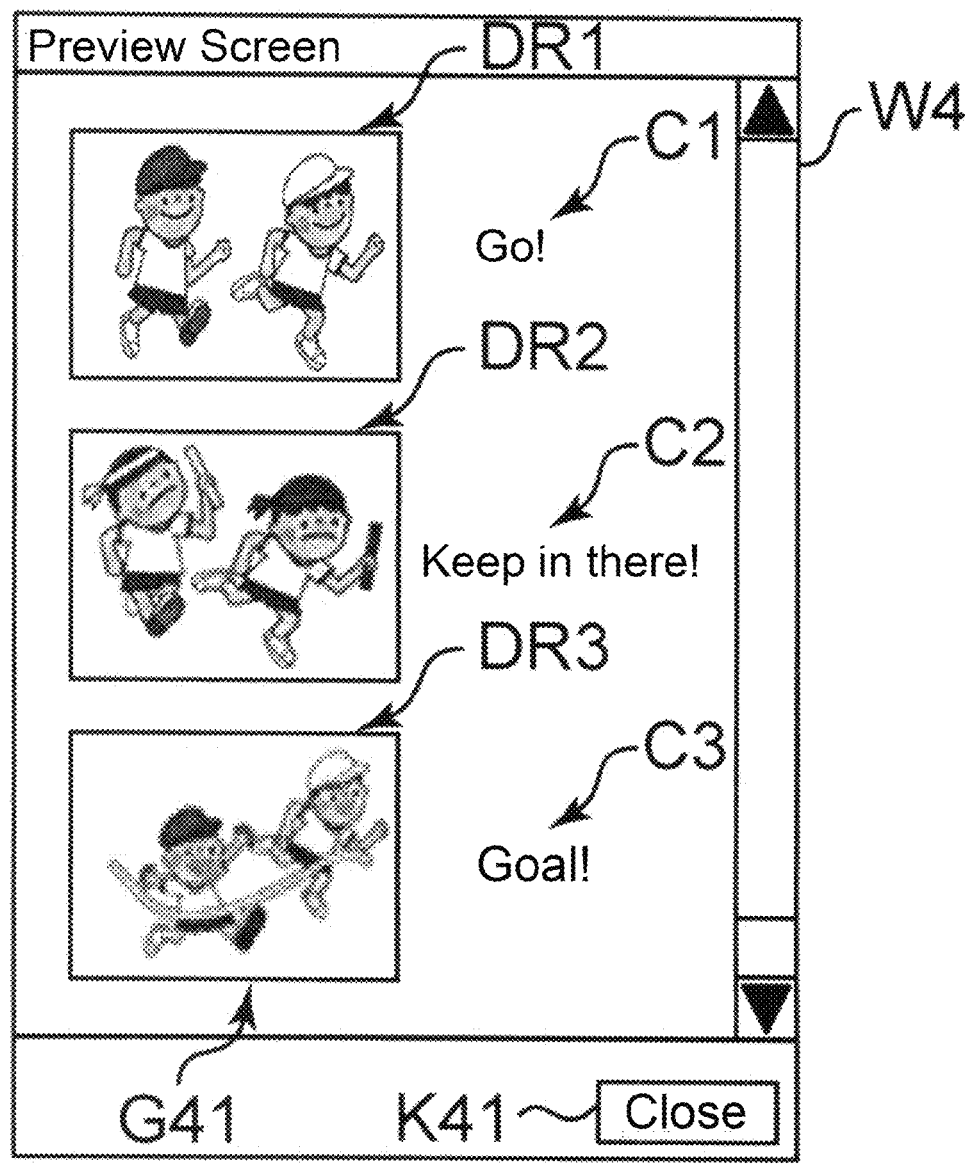
FIG. 9C illustrates an example of the preview screen when changing an output size.
Figure 9D:
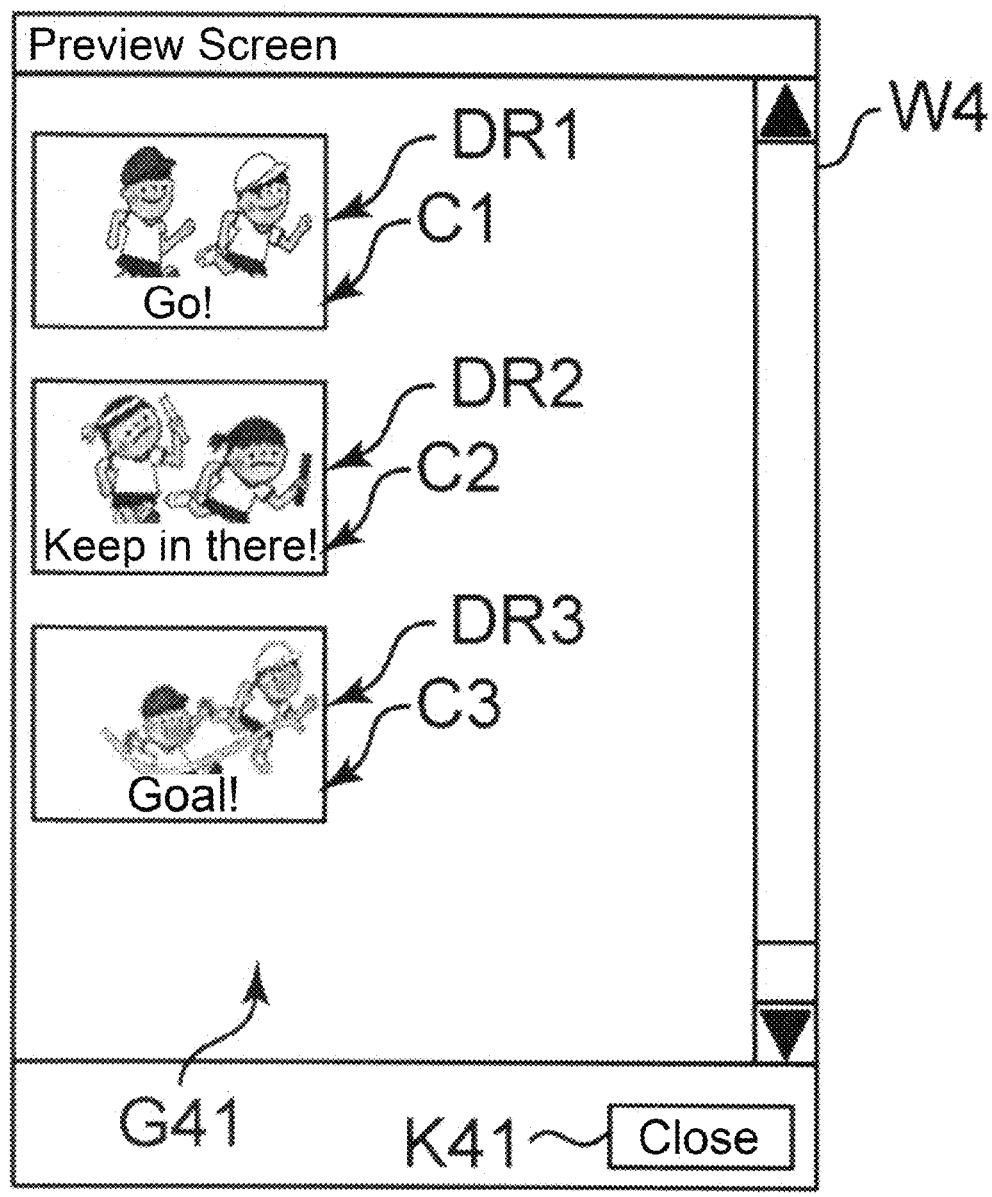
FIG. 9D illustrates an example of the preview screen when changing the relative output position.

FIG. 9A illustrates an example of the preview screen when using predetermined output conditions. FIG. 9B illustrates an example of the preview screen when changing the layout and the relative output position. FIG. 9C illustrates an example of the preview screen when changing the output size. FIG. 9D illustrates an example of the preview screen when changing the relative output position.

As illustrated in FIGS. 9A to 9D, in the preview output process at Step S31, a preview screen W4, which is displayed on the display unit 331, includes a preview display field G41 and a close button K41. The image output unit 19 displays images on the preview display field G41. The images display respective representative images DR1 (DR2 and DR3) made correspond to scene character strings C1 (C2 and C3) in accordance with the output conditions, which have been accepted by the output condition accepting unit 20. The scene character strings C1 (C2 and C3) express the scenes corresponding to these respective representative images DR1 (DR2 and DR3).

For example, assume that the preview button K31 is pressed without changing the predetermined output conditions input at the beginning of displaying the output condition setting screen W3 and the output condition accepting unit 20 accepts these predetermined output conditions. Assume that these predetermined output conditions are: "Align Vertically" by which the respective representative images are sequentially aligned vertically as the layout, "Automatic," which automatically determines the output size as the method for determining the output size, and "Right" indicative of the scene character string being output on the right portion of the representative image as the relative output position.

In this case, as illustrated in FIG. 9A, the image output unit 19 converts the sizes of the respective representative images into the optimum sizes corresponding to the resolutions of these respective representative images in accordance with the predetermined output condition. The preview display field G41 displays the images displayed by sequentially aligning the respective representative images DR1, DR2, and DR3, which have been converted into these optimum sizes, vertically. The image output unit 19 displays the scene character strings C1 (C2 and C3) on the right portions of these representative images DR1 (DR2 and DR3) in these images displayed in the preview display field G41. The scene character strings C1 (C2 and C3) express the scenes corresponding to these respective representative images DR1 (DR2 and DR3), which have been accepted at Step S11 (FIG. 5).

Alternatively, assume that at Step S21, the user selects and inputs "Align Horizontally" as the layout by which the respective representative images are sequentially aligned horizontally, "Automatic," which automatically determines the output size as the method for determining the output size, and "Down," which indicates that the scene character string is output on the lower portion of the representative image, as the relative output position in the output condition setting screen W3. After that, the user presses the preview button K31, and the output condition accepting unit 20 accepts these selected and input output conditions.

In this case, as illustrated in FIG. 9B, the image output unit 19 converts the sizes of the respective representative images into the optimum sizes corresponding to the resolutions of these respective representative images in accordance with this accepted output condition. The preview display field G41 displays the images displayed by sequentially aligning the respective representative images DR1, DR2, and DR3, which have been converted into these optimum sizes, horizontally. The image output unit 19 displays the scene character strings C1 (C2 and C3) on the lower portions of these respective representative images DR1 (DR2 and DR3) in these images displayed in the preview display field G41. The scene character strings C1 (C2 and C3) express the scenes corresponding to these respective representative images DR1 (DR2 and DR3), which have been accepted at Step S11 (FIG. 5).

Alternatively, assume that at Step S21, the user selects and inputs "Align Vertically" as the layout by which the respective representative images are sequentially aligned vertically, "Manual," which causes the user to determine the output size as the method for determining the output size, "130%" as the one conversion percentage, and "Right," which indicates that the scene character string is output on the right portion of the representative image, as the relative output position in the output condition setting screen W3. After that, the user presses the preview button K31, and the output condition accepting unit 20 accepts these selected and input output conditions.

In this case, as illustrated in FIG. 9C, the image output unit 19 converts the sizes of the respective representative images into the one conversion percentage, "130%," in accordance with this accepted output condition to enlarge the representative images. The image output unit 19 displays the images displayed by sequentially aligning the respective representative images DR1, DR2, and DR3 with the sizes after this enlargement vertically on the preview display field G41. The image output unit 19 displays the scene character strings C1 (C2 and C3) on the right portions of these respective representative images DR1 (DR2 and DR3) in these images displayed in the preview display field G41. The scene character strings C1 (C2 and C3) express the scene corresponding to these respective representative images DR1 (DR2 and DR3), which have been accepted at Step S11 (FIG. 5).

Alternatively, assume that at Step S21, the user selects and inputs "Align Vertically" as the layout by which the respective representative images are sequentially aligned vertically, "Automatic," which automatically determines the output size as the method for determining the output size, and "Overlap," which indicates that the scene character string is output overlapping with the representative image as the relative output position in the output condition setting screen W3. After that, the user presses the preview button K31, and the output condition accepting unit 20 accepts these selected and input output conditions.

In this case, as illustrated in FIG. 9D, the image output unit 19 converts the sizes of the respective representative images into the optimum sizes corresponding to the resolutions of these respective representative images in accordance with this accepted output condition. The preview display field G41 displays the images displayed by sequentially aligning the respective representative images DR1, DR2, and DR3, which have been converted into these optimum sizes, vertically. The image output unit 19 displays the scene character strings C1 (C2 and C3) overlapped with these respective representative images DR1 (DR2 and DR3) in these images displayed in the preview display field G41. The scene character strings C1 (C2 and C3) express the scene corresponding to these respective representative images DR1 (DR2 and DR3), which have been accepted at Step S11 (FIG. 5).

When the close button K41 is pressed, the image output unit 19 terminates displaying the preview screen W4 on the display unit 331.

Now referring to FIG. 6 again, assume that after inputting the output conditions to output the respective representative images at Step S21, the print all button K32 is pressed (S30: NO and S40: YES).

In this case, the output condition accepting unit 20 accepts the output conditions, which have been input at Step S21. The image output unit 19 performs the all-print-output process using these accepted output conditions (S41). Afterwards, processes after Step S21 are performed.

Specifically, at Step S41, the image output unit 19 causes the image forming unit 32 to perform the printing process. The printing process forms the images identical to the images displayed on the preview display field G41 in the preview screen W4 using the output conditions accepted by the output condition accepting unit 20 by the preview output process at Step S31 on paper sheets.

For example, assume that the print all button K32 is pressed without changing the predetermined output conditions described at Step S31, which have been input at the beginning of displaying the output condition setting screen W3 at Step S21. Assume that, by this operation, the output condition accepting unit 20 accepts these predetermined output conditions. In this case, the image output unit 19 causes the image forming unit 32 to perform the printing process. The printing process forms the images identical to the images illustrated in FIG. 9A, which are the images displayed in the preview display field G41 in the preview screen W4 at Step S31.

Now referring to FIG. 6 again, assume that after inputting the output conditions to output the respective representative images at Step S21, the print individually button K33 is pressed (S30: NO, S40: NO, and S50: YES).

In this case, the output condition accepting unit 20 accepts the output conditions, which have been input at Step S21. The image accepting unit 21 displays the individual print output screen on the display unit 331. Using this individual print output screen, the image accepting unit 21 accepts the selection of the target representative image to be individually output from the user among the respective representative images accepted by the selection accepting unit 18 (S51).

Figure 10:
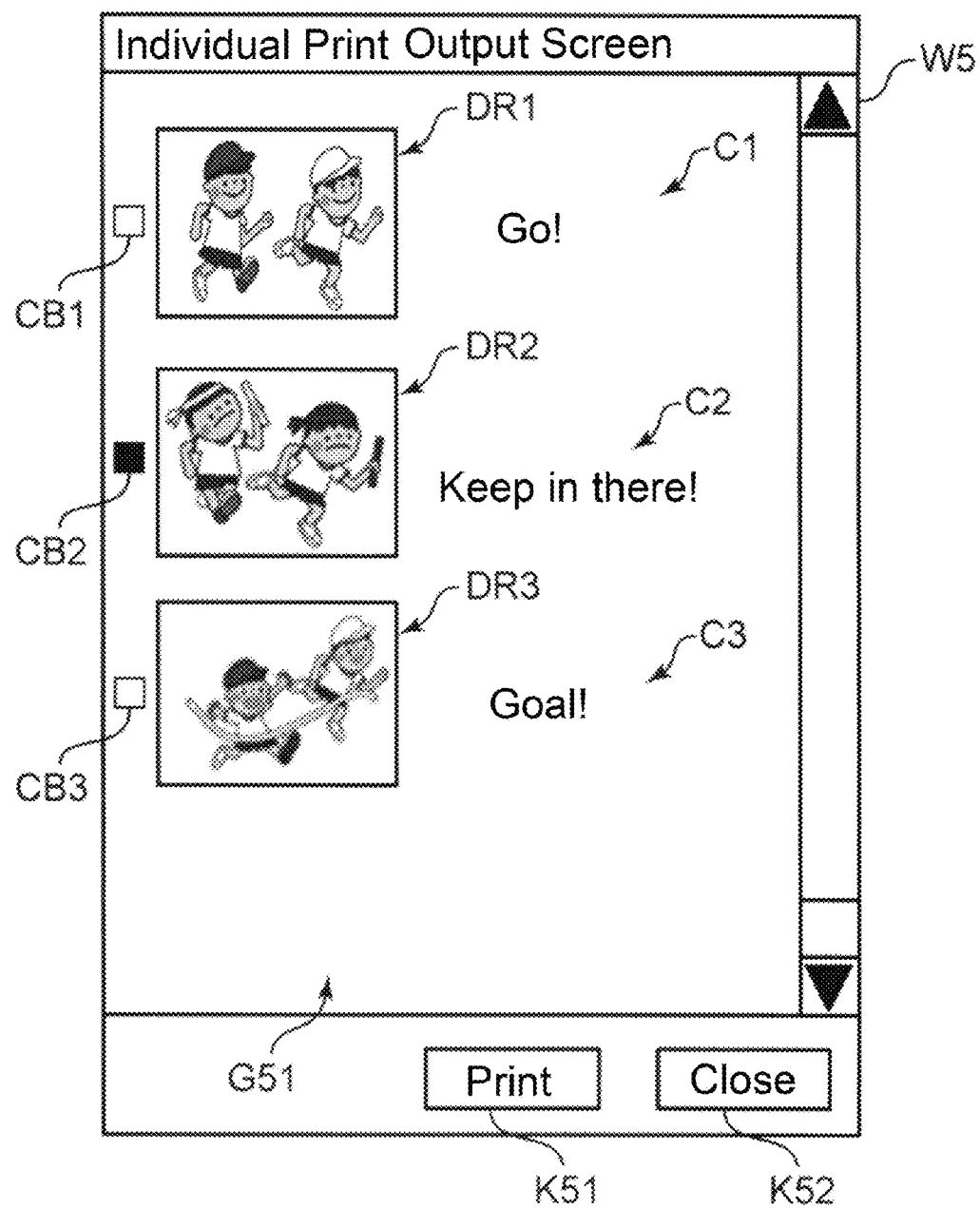
FIG. 10 illustrates an example of an individual print output screen.

FIG. 10 illustrates an example of an individual print output screen W5. Specifically, as illustrated in FIG. 10, the individual print output screen W5 includes a preview display field G51, a print button K51, and a close button K52.

The image output unit 19 displays images on the preview display field G51, similar to the preview display field G41 in the preview screen W4. The images display the respective representative images DR1 (DR2 and DR3) made correspond to the scene character strings C1 (C2 and C3) using the output conditions, which have been accepted by the output condition accepting unit 20. The scene character strings C1 (C2 and C3) express the scenes corresponding to these respective representative images DR1 (DR2 and DR3). Further, the image output unit 19 displays selection fields CB1 (CB2 and CB3) for the images displayed on the preview display field G51. The selection fields CB1 (CB2 and CB3) are made correspond to the respective representative images DR1 (DR2 and DR3).

FIG. 10 illustrates the individual print output screen W5, which is displayed when the output condition accepting unit 20 accepts the predetermined output conditions described at Step S31. That is, the preview display field G51 in the individual print output screen W5, which is illustrated in FIG. 10, further displays the selection fields CB1 (CB2 and CB3) made correspond to the respective representative images DR1 (DR2 and DR3) for the images displayed in the preview display field G41 in the preview screen W4, which is illustrated in FIG. 9A.

The user operates the operation unit 33 to select and input the selection field CB1, CB2, or CB3, which corresponds to the target representative image to be individually output, among the respective representative images DR1, DR2, and DR3 displayed in the preview display field G51. For example, FIG. 10 illustrates the case where the user selects and inputs the selection field CB2. When the user selects and inputs at least one or more of the selection fields, the image accepting unit 21 accepts the respective representative images corresponding to these selected and input selection fields as the target representative images to be individually output.

The print button K51 is a button to perform an individual print output process. The individual print output process is a process that causes the image forming unit 32 to perform the printing process to output the respective representative images. The printing process individually forms the respective representative images accepted by the image accepting unit 21 on the paper sheet. The close button K52 is a button to terminate displaying the individual print output screen W5 on the display unit 331.

Now referring to FIG. 6 again, assume that the image accepting unit 21 accepts the target representative image to be individually output at Step S51. After that, the print button K51 on the individual print output screen W5 is pressed (S52: print). In this case, the image output unit 19 performs the individual print output process (S53). That is, the image output unit 19, at Step S53, causes the image forming unit 32 to perform the printing process. The printing process forms the respective representative images accepted by the image accepting unit 21 individually on the paper sheets.

For example, assume that the image accepting unit 21 accepts the two representative images DR1 and DR2, which are illustrated in FIG. 10, as the target representative images to be individually output at Step S51. After that, the print button K51 on the individual print output screen W5 is pressed. In this case, in the individual print output process at Step S53, the image output unit 19 causes the image forming unit 32 to perform the printing process, which forms the representative image DR1 on a paper sheet and the printing process, which forms the representative image DR2 on a paper sheet. Thus, the image output unit 19 causes the image forming unit 32 to perform the printing processes to form the respective representative images DR1 and DR2 accepted by the image accepting unit 21 individually on the paper sheets.

Meanwhile, at Step S51, when the close button K52 on the individual print output screen W5 is pressed (S52: close), the image output unit 19 does not perform the individual print output process and the image accepting unit 21 terminates displaying the individual print output screen W5 on the display unit 331. Afterwards, processes after Step S21 are performed.

Assume that the finish button K35 is pressed on the output condition setting screen W3 (S30: NO, S40: NO, S50: NO, and S60: YES).

In this case, image output unit 19 makes the accepted moving image data DM accepted at Step S1, the image data showing each representative image, the screen data showing the representative image selection screen W2 used to select each of these representative images, and identification information of this screen data correspond to one another and stores them on the storage unit 34 (S61). Then, the output condition accepting unit 20 terminates displaying the output condition setting screen W3 on the display unit 331.

Figure 11:
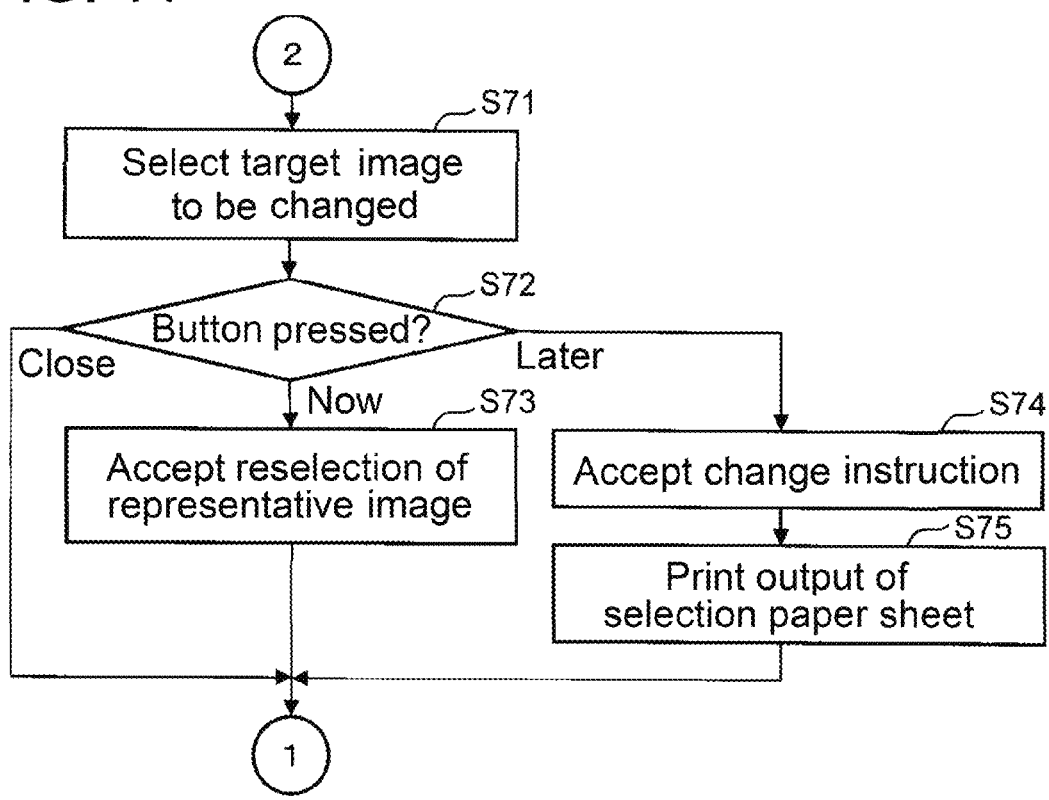
FIG. 11 illustrates operations of changing the representative image.

Assume that after inputting the output conditions to output the respective representative images at Step S21, the change image button K34 is pressed (S30: NO, S40: NO, S50: NO, and S60: NO). In this case, the output condition accepting unit 20 accepts the output conditions, which have been input at Step S21. FIG. 11 illustrates operations of changing the representative image.

In this case, as shown in FIG. 11, the change accepting unit 22 displays the change target selection screen on the display unit 331. The change accepting unit 22 causes the user to select the target representative image to be changed among the respective representative images accepted by the selection accepting unit 18 in this change target selection screen (S71).

Figure 12:
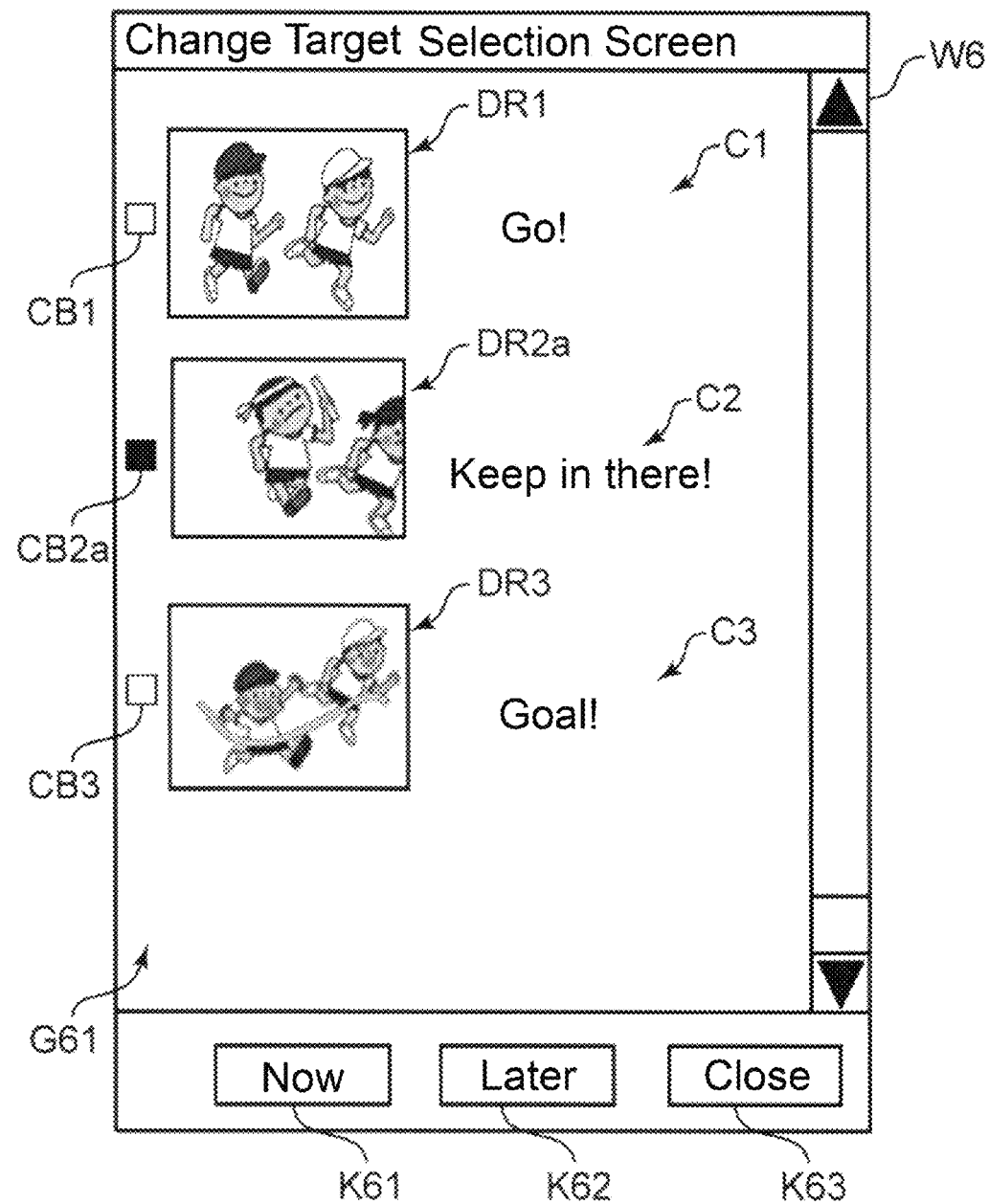
FIG. 12 illustrates an example of a change target selection screen.

FIG. 12 illustrates an example of a change target selection screen W6. Specifically, as illustrated in FIG. 12, the change target selection screen W6 includes a preview display field G61, a now button K61, a later button K62, and the close button K63.

The image output unit 19 displays images on the preview display field G61, similar to the preview display field G51 in the individual print output screen W5. The images display the selection fields CB1 (CB2a and CB3) made correspond to the respective representative images DR1 (DR2*a* and DR3) and the character strings C1 (C2 and C3) using the output conditions, which have been accepted by the output condition accepting unit 20. The scene character strings C1 (C2 and C3) express the scenes corresponding to these respective representative images DR1 (DR2*a* and DR3).

FIG. 12 illustrates the change target selection screen W6, which is displayed when the output condition accepting unit 20 accepts the predetermined output conditions described at Step S31. FIG. 12 illustrates the case where, instead of the representative image DR2, which is displayed in the above-described preview display field G51 (FIG. 10) or a similar field in the individual print output screen W5, the selection accepting unit 18 accepts a representative image DR2*a*.

The user operates the operation unit 33 to select the selection field CB1, CB2*a*, or CB3 corresponding to the target representative image to be changed among the respective representative images DR1, DR2*a*, and DR3, which are displayed in the preview display field G61. For example, in FIG. 12, the representative image DR2*a*, which is displayed in the preview display field G61, is an image where a part of the photographic subject lacks. Accordingly, this suggests that the user selects the selection field CB2*a* to set the representative image DR2*a* as the target representative image to be changed.

When the now button K61 is pressed, the change accepting unit 22 accepts each representative image corresponding to the selected selection field as the target representative image to be changed.

The now button K61 is a button to cause the selection accepting unit 18 to perform a reselection process. The reselection process is a process of accepting the reselection of the representative image among the frame images FD displayed in a list in the representative image selection screen W2 (FIG. 4), which is used to select each representative image accepted by the change accepting unit 22.

When none of the selection fields are selected among the selection fields CB1, CB2*a*, and CB3 displayed in the preview display field G61, the change accepting unit 22 disables pressing the now button K61 (greyed). The user presses the now button K61 to promptly change the representative image any of the representative images displayed in the preview display field G61 or a similar case.

The later button K62 is a button to input a change instruction. The change instruction changes any of the representative images among the respective representative images, which are displayed in the preview display field G61, accepted by the selection accepting unit 18. The user presses the later button K62 to not promptly but to later select the target representative image to be changed among the representative images displayed in the preview display field G61 later or a similar case.

The close button K63 is a button to terminate displaying the change target selection screen W6 on the display unit 331.

Now referring to FIG. 11 again, assume that the user selects the selection field corresponding to the target representative image to be changed on the change target selection screen W6 at Step S71. After that, the now button K61 is pressed (S72: now).

In this case, the change accepting unit 22 accepts each representative image corresponding to this selected and input selection field as the target representative image to be changed. The change accepting unit 22 terminates displaying the change target selection screen W6 on the display unit 331. Then, the selection accepting unit 18 performs the above-described reselection process.

That is, when starting the reselection process, similar to Step S11 (FIG. 5), the selection accepting unit 18 sequentially displays the representative image selection screens W2, which are used to select each representative image accepted by the change accepting unit 22, on the display unit 331. The selection accepting unit 18 accepts the reselection of the representative image, which represents each scene corresponding to each representative image selection screen W2, or the non-selection instruction image NS and the re-input of character string expressing each scene. After that, the selection accepting unit 18 terminates displaying the respective representative image selection screens W2 on the display unit 331 (S73). Afterwards, processes after Step S21 (FIG. 6) are performed.

Meanwhile, assume that the later button K62 is pressed on the change target selection screen W6 (S72: later). In this case, the change instruction accepting unit 23 accepts the input of the change instruction, which changes any of the representative images among the respective representative images accepted by the selection accepting unit 18 (S74). In this case, the selected paper sheet output unit 24 causes the image forming unit 32 to perform the printing process, which forms a selection list image on a paper sheet, to output a selection paper sheet on which this selection list image is formed (S75).

Figure 13:
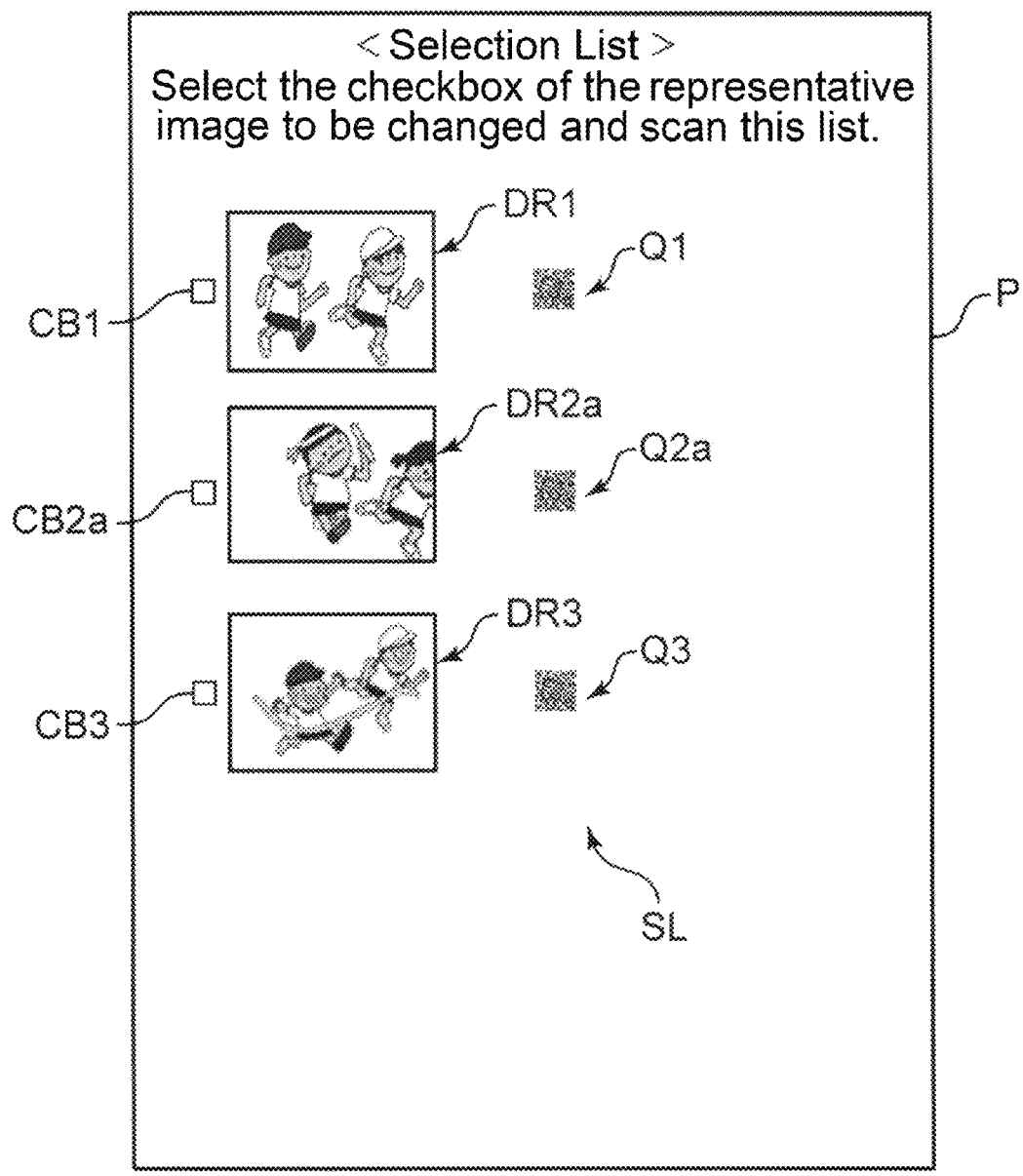
FIG. 13 illustrates an example of a selection paper sheet according to one embodiment.

The selection list image is an image where the respective representative images accepted by the selection accepting unit 18, selection fields to which a predetermined selection mark can be written, and the identification information of the representative image selection screens W2 used to select each of these representative images are made correspond. FIG. 13 illustrates an example of a selection paper sheet P.

Specifically, as illustrated in FIG. 13, at Step S75, similar to the images (FIG. 12) displayed on the preview display field G61 in the change target selection screen W6 by the image output unit 19, the selected paper sheet output unit 24 uses the output conditions accepted by the output condition accepting unit 20 to create a selection list image SL. In the selection list image SL, the respective representative images DR1 (DR2*a* and DR3), the selection fields CB1 (CB2*a* and CB3), and QR codes (registered trademark) Q1 (Q2*a* and Q3) are displayed made correspond to one another. The QR codes Q1 (Q2*a* and Q3) show the identification information of the representative image selection screens W2 used to select these respective representative images.

The selected paper sheet output unit 24 may display another image expressing this identification information, such as a woven pattern and a one-dimensional barcode, in the selection list image SL instead of the QR code, which shows the identification information of the representative image selection screen W2.

The selected paper sheet output unit 24 causes the image forming unit 32 to perform the printing process, which forms this created selection list image SL on the paper sheet, to output the selection paper sheet P on which this selection list image SL is formed. FIG. 13 illustrates the selection paper sheet P output when the output condition accepting unit 20 accepts the predetermined output conditions described at Step S31.

After execution of Step S75, the change accepting unit 22 terminates displaying the change target selection screen W6 on the display unit 331 and the processes after Step S21 (FIG. 6) are performed.

Figure 14:
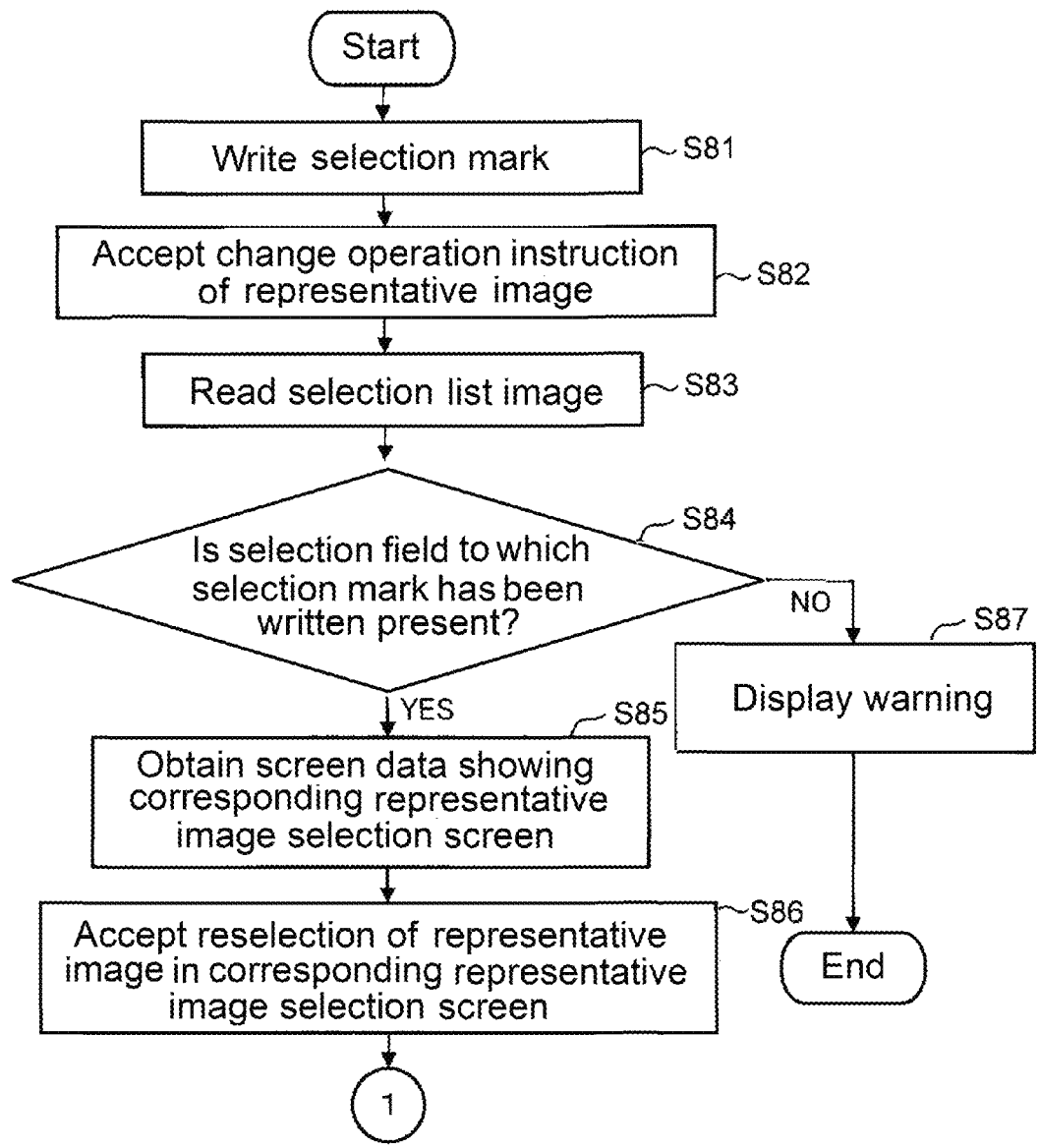
FIG. 14 illustrates operations of changing the representative image using the selection paper sheet.

The following describes operations of changing the representative image using the selection paper sheet P, which is output at Step S75. FIG. 14 illustrates operations of changing the representative image using the selection paper sheet P. The following describes assuming that the selection paper sheet P illustrated in FIG. 13 is used.

As illustrated in FIG. 14, among the respective representative images DR1, DR2a, and DR3 displayed on the selection paper sheet P, the user writes a selection mark on the selection field CB1, CB2a, or CB3 corresponding to the target representative image to be changed (S81). "Writes a selection mark on the selection field" means that the selection mark is filled in or the selection field is selected such that the selection of selection field becomes identifiable.

When the user operates the operation unit 33 to input the execution instruction of the operation of changing the representative image using the selection paper sheet P, the change instruction accepting unit 23 accepts this execution instruction (S82).

When the change instruction accepting unit 23 accepts the execution instruction, the selection accepting unit 18 displays a message, which guides the user to read the selection list image SL formed in the selection paper sheet P, on the display unit 331. This message is, for example, "Place the selection paper sheet on the platen and execute the scanning process."

Thus, when the user operates the operation unit 33 to input the execution instruction of the scanning process, which causes the image reading unit 31 to read the selection list image SL formed on the selection paper sheet P, the selection accepting unit 18 causes the image reading unit 31 to perform the scanning process, which reads the selection list image SL formed on the selection paper sheet P (S83).

As the execution result of the scanning process at Step S83, when the image data showing the selection list image SL is input to the control unit 10, the selection accepting unit 18 determines whether the selection field CB1, CB2a, or CB3 on which the selection mark has been written is present in the selection list image SL shown by this image data or not (S84).

Assume that the selection accepting unit 18 determines that the selection field CB1, CB2a, or CB3 on which the selection mark has been written is present (S84: YES). In this case, the selection accepting unit 18 decodes the identification information expressed by the respective QR code Q1, Q2a, or Q3, which is displayed made correspond to each selection field CB1, CB2a, or CB3 on which this selection mark has been written in this selection list image SL.

The selection accepting unit 18 obtains the screen data. The screen data shows each representative image selection screen W2 stored on the storage unit 34 made correspond to each piece of this decoded identification information (S85). That is, the selection accepting unit 18, at Step S85, obtains the screen data showing each representative image selection screen W2 used to select each representative image corresponding to each selection field CB1, CB2a, or CB3 on which this selection mark has been written.

The selection accepting unit 18, similar to Step S11 (FIG. 5), displays the respective representative image selection screens W2 shown by the screen data obtained at Step S85 sequentially on the display unit 331. The selection accepting unit 18 accepts the reselection of the representative image, which represents each scene corresponding to each of these respective representative image selection screens W2, or the non-selection instruction image NS, and the re-input of character string expressing each scene. After that, the selection accepting unit 18 terminates displaying the respective representative image selection screens W2 on the display unit 331 (S86). Afterwards, processes after Step S21 (FIG. 6) are performed.

Meanwhile, assume that, at Step S84, the selection accepting unit 18 determines that the selection field on which the selection mark has been written is not present in the selection list image SL (S84: NO).

In this case, the selection accepting unit 18 displays a warning message on the display unit 331 (S87). The selection accepting unit 18 terminates the operation of changing the representative image using the selection paper sheet P. This warning message is a message that guides the user to re-execute the operation of changing the representative image after the user inputs the selection mark in any of the selection fields in the selection list image SL. For example, this warning message is "After selecting the check field for the representative image to be changed, execute the operation again."

Thus, with the configuration of the embodiment, the following effects can be obtained.

That is, with the configuration of the embodiment, in the accepted moving image data DM, one or more reference sample point BS where the change in voice volume is characteristic is detected. At the reference sample point BS, the voice volume of voice increases equal to or more than the predetermined reference voice volume difference with respect to the voice volume of voice corresponding to the immediately previous sample point. The images by the predetermined number of samples, which include the reference images D corresponding to the respective reference sample points BS and are aligned chronologically, are extracted as the frame image FD, which constitutes the scene corresponding to each of these reference sample points BS.

That is, with the configuration of the embodiment, one or more scene where the change in voice volume is characteristic, which is considered as showing the distinctive content of the moving image shown by the accepted moving image data DM, can be automatically detected without labor of the user. The images by the predetermined number of samples chronologically aligned and correspond to these detected respective scenes can be automatically extracted as the frame image FD, which constitutes each of these respective scenes, without labor of the user.

Then, using the representative image selection screen W2 (FIG. 4) where these extracted respective frame images FD are displayed in a list, the user can select the intended image among these respective frame images FD as the representative image representing the respective scenes and output each of these selected representative images.

Thus, with the configuration of the embodiment, the image that shows the distinctive content of the moving image intended by the user can be easily extracted and output from the accepted moving image data DM.

With the configuration of the embodiment, even if the moving image shown by the accepted moving image data DM is a moving image whose change in voice volume is entirely small, the user decreases the reference voice volume difference input to the entry field G13 (FIG. 3) in the condition setting screen W1. By this operation, the detecting unit 12 can detect the reference sample points BS. To the contrary, even if the moving image shown by the accepted moving image data DM is a moving image whose change in voice volume is entirely large, the user increases the input reference voice volume difference. This operation ensures reducing the possibility of detection of many reference sample points BS unnecessary by the detecting unit 12.

Thus, the user adjusts the input reference voice volume difference, so as to adjust the number of reference sample points BS detected by the detecting unit 12 can be adjusted. Accordingly, the user can adjust the number of the representative image selection screens W2 (FIG. 4) used to select the representative image, which represents the respective scenes corresponding to the respective reference sample points BS. This ensures adjusting the number of selected representative images.

With the configuration of the embodiment, the frame images FD each contain the images corresponding to the sample points away from the reference sample point BS to the past and/or the future in units of the predetermined reference times BT. In view of this, when the user selects the image as the representative image among the continuous images aligned chronologically in units of the reference times BT included in the respective frame images FD, the user can select the intended image while considering the time relative to the reference sample point BS.

With the configuration of the embodiment, by the user decreasing the reference time BT input to the entry field G14 (FIG. 3) in the condition setting screen W1, the image corresponding to the sample point timely close to the reference sample point BS can be included in the frame image FD. By the user increasing the input reference time BT, the image corresponding to the sample point timely away of the reference sample point BS can be included in the frame image FD. Thus, when the user adjusts the input the reference time BT, the image included in the frame image FD can be adjusted.

With the configuration of the embodiment, by the user adjusting the number of samples input to the entry field G15 (FIG. 3) in the condition setting screen W1, the number of images included in the frame image FD can be adjusted. In view of this, by the user decreasing the input number of samples, the number of images included in the frame image FD is reduced, ensuring efficiently selecting the representative image. In contrast to this, by the user increasing the input number of samples, the number of images included in the frame image FD is increased. This ensures increasing the possibility of selecting the representative image close to the intended image.

With the configuration of the embodiment, assume case where the user preliminary knows a time slot during which a change in voice volume is large in the moving image shown by the accepted moving image data DM. The user inputs the start time of this time slot to the entry field G11 (FIG. 3) in the condition setting screen W1 and inputs the finishing time of this time slot to the entry field G12 (FIG. 3) in the condition setting screen W1. Accordingly, the detecting unit 12 can efficiently detect the reference sample points BS.

With the configuration of the embodiment, whenever the number of the reference sample points BS detected by the detecting unit 12 reaches the predetermined number of restrictions (S9: NO, FIG. 5), the user can select whether to continue the detection of the reference sample points BS by the detecting unit 12 or not. In view of this, by the detecting unit 12 continuing detecting the reference sample points BS with no restriction, the user can reduce the possibility of unnecessarily increase in the number of representative images.

With the configuration of the embodiment, when the user does not have the image desired to be selected as the representative image in the frame images FD, selecting the non-selection instruction image NS (FIG. 4) (inputting the non-selection instruction) ensures avoiding the selection of unintended representative image.

With the configuration of the embodiment, the respective representative images are output located by the predetermined layout. This allows the user to easily view the respective output representative images.

With the configuration of the embodiment, the user selects the intended layout in the layout selection field G31 (FIG. 7) in the output condition setting screen W3. This ensures outputting the respective representative images located by the intended layout.

With the configuration of the embodiment, when the representative image desired to be individually output is included in the respective representative images accepted by the selection accepting unit 18, using the individual print output screen W5, the user selects this representative image as the target to be individually output. This ensures individually outputting this representative image (S51 to S53, FIG. 6).

With the configuration of the embodiment, when the plurality of representative images are output, since the sizes of the respective representative images are uniform to the predetermined output size, the user easily views these plurality of representative images.

With the configuration of the embodiment, when the user selects "Automatic" as the method for determining the output size in the output size selection field G32 (FIG. 7) in the output condition setting screen W3, the representative image is output at the optimum size. Accordingly, the user easily views the representative image.

With the configuration of the embodiment, when the user selects "Manual" as the method for determining the output size in the output size selection field G32 (FIG. 7) in the output condition setting screen W3 and further adjusts the one conversion percentage, which is selected from the list box. This ensures adjusting the sizes of the respective representative images output by the image output unit 19 to the intended sizes.

With the configuration of the embodiment, the representative image representing the scene and the scene character string, which is input to the entry field G22 in the representative image selection screen W2 (FIG. 4) to express this scene, are made correspond to and output. In view of this, the user inputs the character string clearly expressing the feature of the scene corresponding to the representative image to the entry field G22 in the representative image selection screen W2 (FIG. 4). Compared with the case of outputting only the representative image, this ensures outputting the representative image further clarifying the feature of the scene corresponding to the representative image.

With the configuration of the embodiment, the character string recognizing unit 15 automatically inputs the scene character string to be output made correspond to the representative image, which represents the scenes, to the entry field G22b in the representative image selection screen W2 (FIG. 4) corresponding to this scene. This allows the user to reduce a labor for inputting the scene character string to the entry field G22 in the representative image selection screen W2 (FIG. 4).

With the configuration of the embodiment, the user selects the intended relative output position in the output position selection field G33 (FIG. 7) in the output condition setting screen W3. This ensures outputting the scene character string to the intended position. Accordingly, compared with the case where the relative output position to the representative image of the scene character string is fixed, the user can improve viewability of the representative image and the scene character string.

With the configuration of the embodiment, selecting "Overlap" as the relative output position in the output position selection field G33 (FIG. 7) in the output condition setting screen W3 ensures outputting the scene character string overlapped with the representative image. In this case, the space occupied by the representative image and the scene character string can be reduced.

With the configuration of the embodiment, even if the user incorrectly selects the representative image, the user can reselect the representative image in the representative image selection screen W2 (FIG. 4) used to select this representative image. Accordingly, this incorrectly selected representative image can be changed to the intended representative image (S71 to S73, FIG. 11).

With the configuration of the embodiment, after the user inputs the change instruction to output the selection paper sheet P (S74 and S75, FIG. 11), the user can write the selection mark in the selection field corresponding to the target representative image to be changed in this selection paper sheet P at convenient time. At convenient time, the user causes the image reading unit 31 to read the selection list image SL (FIG. 13) formed on this selection paper sheet P. This ensures changing this target representative image to be changed to the intended representative image (S81 to S86, FIG. 14).

The embodiment is merely an example of the embodiment according to the disclosure and not intended to limit the disclosure to the embodiment. For example the following modifications of the embodiment may be employed.

(1) The change target selection screen W6 (FIG. 12) may not include the later button K62. In accordance with this, the control unit 10 may not operate as the change instruction accepting unit 23 and the selected paper sheet output unit 24. Steps S74 and S75, which are illustrated in FIG. 11, and the operations illustrated in FIG. 14 may be omitted. Alternatively, the change target selection screen W6 (FIG. 12) may not include the now button K61. Step S73, which is illustrated in FIG. 11, may be omitted. Alternatively, the output condition setting screen W3 (FIG. 7) may not include the change image button K34. In accordance with this, the control unit 10 may not operate as the change accepting unit 22, the change instruction accepting unit 23, and the selected paper sheet output unit 24. The operations illustrated in FIGS. 11 and 14 may be omitted.

(2) The output condition accepting unit 20 may not display "Overlap" as the relative output position in the output position selection field G33 in the output condition setting screen W3 (FIG. 7). Alternatively, the output condition setting screen W3 (FIG. 7) may not include the output position selection field G33. The image output unit 19 may output the scene character string at the relative output position preliminary stored on the non-volatile memory or a similar memory.

(3) The control unit 10 may not operate as the voice extraction unit 14 and the character string recognizing unit 15. Steps S5 and S6, which are illustrated in FIG. 5, may be omitted.

(4) The representative image selection screen W2 (FIG. 4) may not include the entry field G22. The image output unit 19 may not output the scene character string expressing the scene corresponding to each representative image.

(5) The output condition accepting unit 20 may not display "Manual" as the method for determining the output size and the list box in the output size selection field G32 in the output condition setting screen W3 (FIG. 7). Alternatively, the output condition accepting unit 20 may not display "Automatic" as the method for determining the output size in the output size selection field G32. In accordance with this, the storage unit 34 may not store the resolution of image and the optimum size, which is the size of image optimal to output the image with this resolution. Alternatively, the output condition setting screen W3 (FIG. 7) may not include the output size selection field G32. The image output unit 19 may output the representative images without the sizes of the representative images converted.

(6) The screen creating unit 17 may not display the non-selection instruction image NS in the selection field G21 in the representative image selection screen W2 (FIG. 4).

(7) Steps S9 and S12, which are illustrated in FIG. 5, may be omitted. In accordance with this, when the detecting unit 12 does not terminate the detection of the reference sample points BS (S8: NO) in the accepted moving image data DM in the period from the start time accepted at Step S3 (FIG. 5) until the finishing time, the detecting unit 12 may perform Step S4. That is, the detecting unit 12 may be configured so as not to halt the detection of the reference sample points BS.

(8) The condition setting screen W1 (FIG. 3) may not include the entry field G11 for start time and the entry field G12 for finishing time. In accordance with this, at Step S4 (FIG. 5), the detecting unit 12 may detect the reference sample points BS in the entire period from the start time of the accepted moving image data DM until the finishing time.

(9) The condition setting screen W1 (FIG. 3) may not include the entry field G15 for the number of samples. In accordance with this, at Step S7 (FIG. 5), the image extracting unit 13 may extract the images by the number of samples preliminary stored on the non-volatile memory or a similar memory as the frame image FD.

(10) The condition setting screen W1 (FIG. 3) may not include the entry field G14 for the reference time BT. In accordance with this, the image extracting unit 13, at Step S7 (FIG. 5), may extract the images corresponding to the sample points going back from the reference sample point BS to the past in units of the reference times BT preliminary stored on the non-volatile memory or a similar memory and/or the sample points progressing to the future in units of these reference times BT from the reference sample point BS as the frame images FD. Alternatively, at Step S7 (FIG. 5), the image extracting unit 13 may extract any images by the predetermined number of samples aligned chronologically and include the reference images D corresponding to the reference sample points BS, regardless of the reference time BT.

(11) The condition setting screen W1 (FIG. 3) may not include the entry field G13 for reference voice volume difference. In accordance with this, at Step S4 (FIG. 5), the detecting unit 12 may detect the reference sample points BS using the reference voice volume difference preliminary stored on the non-volatile memory or a similar memory.

(12) With the configuration of the embodiment, the screen creating unit 17 creates the representative image selection screen W2 (FIG. 4) for each scene. The selection accepting unit 18 accepts the selection of one representative image in each representative image selection screen W2. However, instead of this, the screen creating unit 17 may create the one representative image selection screen for a plurality of scenes. The one representative image selection screen displays the plurality of respective frame images, which constitute these plurality of scenes, in a list. In accordance with this, the selection accepting unit 18 may accept the selection of the plurality of representative images representing the plurality of respective scenes in this one representative image selection screen.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
a moving image accepting unit that accepts an input of moving image data, the moving image data including image data and voice data, the image data showing a plurality of images aligned chronologically, the voice data showing a plurality of voices corresponding the plurality of images;
a detecting unit that detects one or more sample points as a reference sample point in accepted moving image data, the accepted moving image data being the moving image data accepted by the moving image accepting unit, a voice volume of the voice increasing equal to or more than a predetermined reference voice volume difference at the reference sample point with respect to a voice volume of a voice corresponding to an immediately previous sample point;
a first accepting unit that accepts input of a start time and a finishing time during a period when the detecting unit is carrying out detection on the accepted moving image data;
an image extracting unit that extracts images by a predetermined count of samples at the respective reference sample points detected by the detecting unit from the accepted moving image data as frame images, the images including reference images corresponding to the reference sample points and being aligned chronologically, the frame images constituting a scene corresponding to the reference sample point;
a screen creating unit that creates an operation screen for each of the scenes, the operation screen displaying the frame images in a list, the frame images constituting each of the scenes extracted by the image extracting unit;
a selection accepting unit that accepts a selection of a representative image in the operation screen created by the screen creating unit, the representative image representing the scenes among the frame images displayed in the list; and
an image output unit that outputs the representative image accepted by the selection accepting unit; wherein
the detecting unit detects the reference sample point in the moving image data, the detection being performed in a period from the start time accepted by the first accepting unit until the finishing time accepted by the first accepting unit in the accepted moving image data;
the detecting unit halts a detection of the reference sample point whenever a count of the detected reference sample points reaches a count of restrictions during the period from the start time accepted by the first accepting unit until the finishing time accepted by the first accepting unit; and
the detecting unit is configured to allow a user to select whether to resume the detection of the reference sample point or not, wherein when the user selects the resumption of the detection of the reference sample point, the detecting unit resumes the detection of the subsequent reference sample point, and when the user selects not to resume the detection of the reference sample point, the detecting unit terminates the detection of the reference sample point.

2. The image processing apparatus according to claim 1, further comprising a second accepting unit that accepts an input of the reference voice volume difference.

3. The image processing apparatus according to claim 1, wherein the image extracting unit extracts images corresponding to sample points going back to a past from the reference sample point in units of predetermined reference times and/or images corresponding to sample points progressing to a future from the reference sample point in units of the reference times as the frame images.

4. The image processing apparatus according to claim 3, further comprising a third accepting unit that accepts an input of the reference time.

5. The image processing apparatus according to claim 1, further comprising a fourth accepting unit that accepts an input of the count of samples.

6. The image processing apparatus according to claim 1, wherein:
the operation screen is configured to accept a non-selection instruction instructing not to select the representative image; and
the selection accepting unit does not accept the selection of the representative image when the non-selection instruction is input to the operation screen, the representative image representing the scenes corresponding to the operation screen.

7. The image processing apparatus according to claim 1, wherein the image output unit outputs the respective representative images accepted by the selection accepting unit located by a predetermined layout.

8. The image processing apparatus according to claim 7, further comprising:
an image accepting unit that accepts a selection of the target representative image to be individually output among the respective representative images accepted by the selection accepting unit; wherein
the image output unit individually outputs the representative image accepted by the image accepting unit.

9. The image processing apparatus according to claim 1, wherein the image output unit converts a size of the representative image into a predetermined output size and outputs the representative image.

10. The image processing apparatus according to claim 9, further comprising:
a size storage unit that preliminary stores a resolution of an image and an optimum size made correspond to one another, the optimum size being a size of an image optimal for outputting the image with the resolution; wherein
the output size is determined as the optimum size made correspond to a resolution of the representative image and stored in the size storage unit.

11. The image processing apparatus according to claim 9, further comprising:
a size accepting unit that accepts an input of a desired size for outputting the representative image; wherein
the image output unit determines the desired size accepted by the size accepting unit as the output size.

12. The image processing apparatus according to claim 1, wherein:
the operation screen includes an entry field for a scene character string, the scene character string being a character string expressing the scene corresponding to the operation screen; and
the image output unit makes the representative image and the scene character string correspond to one another, the image output unit outputting the representative image and the scene character string, the representative image representing the scenes, the scene character string having been input to the entry field in the operation screen corresponding to the scene.

13. The image processing apparatus according to claim 12, further comprising:
   a voice extraction unit that extracts a predetermined count of voices at the respective reference sample points detected by the detecting unit from the accepted moving image data as representative voices, the predetermined count of voices including reference voices corresponding to the reference sample points and being continuous chronologically, the representative voice representing the scenes corresponding to the reference sample points; and
   a character string recognizing unit that inputs a character string to the entry field in the operation screen corresponding to the scene corresponding to each of the representative voices, the character string being recognized by performing a predetermined voice recognition process on the respective representative voices extracted by the voice extraction unit.

14. The image processing apparatus according to claim 12, further comprising a position accepting unit that accepts an input of an output position of the scene character string relative to the representative image from a user when the image output unit outputs the representative image and the scene character string made correspond to one another, the representative image representing the scenes, the scene character string corresponding to the scene.

15. The image processing apparatus according to claim 14, wherein the relative output position includes a position overlapped with the representative image.

16. The image processing apparatus according to claim 1, further comprising:
   a change accepting unit that accepts a selection of the target representative image to be changed among the respective representative images accepted by the selection accepting unit; wherein
   the selection accepting unit accepts a reselection of the representative image among the frame images displayed in a list in the operation screen when the change accepting unit accepts the target representative image to be changed, the operation screen being used to select the target representative image to be changed.

17. An image processing apparatus comprising:
   a moving image accepting unit that accepts an input of moving image data, the moving image data including image data and voice data, the image data showing a plurality of images aligned chronologically, the voice data showing a plurality of voices corresponding the plurality of images;
   a detecting unit that detects one or more sample points as a reference sample point in accepted moving image data, the accepted moving image data being the moving image data accepted by the moving image accepting unit, a voice volume of the voice increasing equal to or more than a predetermined reference voice volume difference at the reference sample point with respect to a voice volume of a voice corresponding to an immediately previous sample point;
   an image extracting unit that extracts images by a predetermined count of samples at the respective reference sample points detected by the detecting unit from the accepted moving image data as frame images, the images including reference images corresponding to the reference sample points and being aligned chronologically, the frame images constituting a scene corresponding to the reference sample point;
   a screen creating unit that creates an operation screen for each of the scenes, the operation screen displaying the frame images in a list, the frame images constituting each of the scenes extracted by the image extracting unit;
   a selection accepting unit that accepts a selection of a representative image in the operation screen created by the screen creating unit, the representative image representing the scenes among the frame images displayed in the list;
   an image output unit that outputs the representative image accepted by the selection accepting unit;
   an image reading unit that reads an image formed on a paper sheet;
   a change instruction accepting unit that accepts an input of a change instruction, the change instruction changing any of the representative images among the respective representative images accepted by the selection accepting unit; and
   a selected paper sheet output unit that outputs a selection paper sheet when the change instruction accepting unit accepts the change instruction, the selection paper sheet being a paper sheet on which selection list images are formed, the respective representative images, selection fields, and identification information of the operation screen are made correspond in the selection list images, the respective representative images being accepted by the selection accepting unit, a predetermined selection mark being writable to the selection fields, the identification information being used to select the respective representative images; wherein
   in a state where the image reading unit reads the selection list images formed on the selection paper sheet, when the selection field for the selection list image to which the selection mark has been written is present, the selection accepting unit accepts a reselection of the representative image among the frame images displayed in a list in the operation screen which is used for the selection of the representative image, the operation screen being identified by the identification information, the identification information made correspond to the selection field for the selection list image.

* * * * *